(12) United States Patent
Hamlyn et al.

(10) Patent No.: US 8,733,417 B2
(45) Date of Patent: *May 27, 2014

(54) FIBER APPLICATION MACHINE

(75) Inventors: Alexander Hamlyn, Ploemeur (FR); Yvan Hardy, Larmor Plage (FR)

(73) Assignee: Coriolis Composites, Lyon (FR)

( * ) Notice: Subject to any disclaimer, the term of this patent is extended or adjusted under 35 U.S.C. 154(b) by 1621 days.

This patent is subject to a terminal disclaimer.

(21) Appl. No.: 11/666,537

(22) PCT Filed: Mar. 2, 2006

(86) PCT No.: PCT/FR2006/000496
§ 371 (c)(1),
(2), (4) Date: Nov. 26, 2008

(87) PCT Pub. No.: WO2006/092514
PCT Pub. Date: Sep. 8, 2006

(65) Prior Publication Data
US 2009/0229760 A1 Sep. 17, 2009

(30) Foreign Application Priority Data
Mar. 3, 2005 (FR) ..................................... 05 02134

(51) Int. Cl.
*B29C 70/38* (2006.01)
(52) U.S. Cl.
USPC ........... 156/433; 156/441; 156/425; 156/523; 156/573
(58) Field of Classification Search
CPC ........................... B29C 70/382; B29C 70/384
USPC ......... 156/169, 173, 175, 433, 441, 425, 523, 156/573
See application file for complete search history.

(56) References Cited

U.S. PATENT DOCUMENTS

| | | |
|---|---|---|
| 494,910 A | 4/1893 | Wells |
| 1,100,829 A | 6/1914 | Joseph |

(Continued)

FOREIGN PATENT DOCUMENTS

| | | |
|---|---|---|
| DE | 1 922 327 U | 8/1965 |
| DE | 37 43 485 | 7/1989 |

(Continued)

OTHER PUBLICATIONS

Evans, Don O., et al, "Fiber Placement Process Study," SAMPE 34.sup.th Symposium Book of Proceedings., May 8-11, 1989, pp. 1-12.*
French Search Report dated Apr. 13, 2010 for French Application No. 09 54963.
French Search Report dated Apr. 15, 2010 for French Application No. 09 54964.
File History for U.S. Appl. No. 11/740,055, filed Apr. 25, 2007.

(Continued)

*Primary Examiner* — Jeff Aftergut
(74) *Attorney, Agent, or Firm* — Patterson Thuente Pedersen, P.A.

(57) ABSTRACT

A fiber application machine including a fiber application head with an application roller for the production of parts made of composite materials. The fiber application head further includes a guiding system to guide the fibers onto the application roller and/or means for the application of resin to each fiber as the fibers leave the guiding system. The fiber application machine can also include a fiber storing system and conveying means for conveying the fibers from the fiber storing system to the application head. The conveying means can comprise flexible tubes, each tube being able to receive a fiber in its inner channel. The conveying means can further include a tension limiting system positioned between the application head and the storing system. The fiber application machine can further include a system for moving the application head.

40 Claims, 11 Drawing Sheets

(56) References Cited

U.S. PATENT DOCUMENTS

| | | | |
|---|---|---|---|
| 1,164,303 A | 12/1915 | Nicewarner | |
| 1,301,354 A | 4/1919 | Baird | |
| 3,206,429 A | 9/1965 | Broyles et al. | |
| 3,238,084 A | 3/1966 | Hawkins | |
| 3,265,795 A | 8/1966 | Medney | |
| 3,300,355 A | 1/1967 | Adams | |
| 3,563,122 A | 2/1971 | De Neui | |
| 3,662,821 A | 5/1972 | Saxon | |
| 3,713,572 A * | 1/1973 | Goldsworthy et al. | 226/7 |
| 3,856,052 A | 12/1974 | Feucht | |
| 4,118,814 A | 10/1978 | Holtom | |
| 4,242,160 A | 12/1980 | Pinter et al. | |
| 4,351,688 A | 9/1982 | Weiss et al. | |
| 4,461,669 A | 7/1984 | Dontscheff | |
| 4,488,466 A | 12/1984 | Jones | |
| 4,562,033 A | 12/1985 | Johnson et al. | |
| 4,569,716 A | 2/1986 | Pugh | |
| 4,574,029 A | 3/1986 | Murray | |
| 4,699,031 A | 10/1987 | D'Angelo et al. | |
| 4,714,509 A | 12/1987 | Gruber | |
| 4,717,330 A | 1/1988 | Sarh | |
| 4,735,672 A | 4/1988 | Blad | |
| 4,849,150 A | 7/1989 | Kittaka et al. | |
| 4,881,998 A * | 11/1989 | Youngkeit | 156/173 |
| 4,976,012 A | 12/1990 | McConnell | |
| 4,990,213 A | 2/1991 | Brown et al. | |
| 4,992,133 A | 2/1991 | Border | |
| 4,997,513 A | 3/1991 | Lengen et al. | |
| 5,015,326 A | 5/1991 | Frank | |
| 5,078,592 A | 1/1992 | Grimshaw et al. | |
| 5,087,187 A | 2/1992 | Simkulak et al. | |
| 5,110,395 A | 5/1992 | Vaniglia | |
| 5,200,018 A * | 4/1993 | Gill et al. | 156/359 |
| 5,290,389 A | 3/1994 | Shupe et al. | |
| 5,397,523 A * | 3/1995 | Curry | 264/136 |
| 5,447,586 A | 9/1995 | Tam | |
| 5,587,041 A | 12/1996 | Sandusky et al. | |
| 5,645,677 A * | 7/1997 | Cahuzac et al. | 156/361 |
| 5,700,347 A | 12/1997 | McCowin | |
| 5,766,357 A * | 6/1998 | Packer et al. | 118/420 |
| 6,026,883 A | 2/2000 | Hegerhorst et al. | |
| 6,073,670 A | 6/2000 | Koury | |
| 6,251,185 B1 | 6/2001 | Morrison et al. | |
| 6,256,889 B1 | 7/2001 | Zuro | |
| 6,451,152 B1 | 9/2002 | Holmes et al. | |
| 6,458,309 B1 | 10/2002 | Allen et al. | |
| 6,490,990 B1 | 12/2002 | Hamlyn et al. | |
| 6,540,000 B1 | 4/2003 | Darrieux et al. | |
| 6,605,171 B1 | 8/2003 | Debalme et al. | |
| 7,048,024 B2 | 5/2006 | Clark et al. | |
| 7,819,160 B2 * | 10/2010 | Hamlyn et al. | 156/425 |
| 7,926,537 B2 | 4/2011 | Hamlyn et al. | |
| 8,052,819 B2 | 11/2011 | Munaux et al. | |
| 8,057,618 B2 | 11/2011 | Hamlyn | |
| 8,191,596 B2 | 6/2012 | Hamlyn et al. | |
| 2002/0014715 A1* | 2/2002 | Wirth et al. | 264/138 |
| 2002/0090408 A1 | 7/2002 | Dahl et al. | |
| 2002/0152860 A1 | 10/2002 | Machamer | |
| 2003/0118681 A1* | 6/2003 | Dahl et al. | 425/126.1 |
| 2004/0031879 A1 | 2/2004 | Kay et al. | |
| 2004/0079838 A1 | 4/2004 | Simpson et al. | |
| 2004/0103948 A1 | 6/2004 | Scheelen et al. | |
| 2005/0023414 A1 | 2/2005 | Braun | |
| 2005/0037195 A1 | 2/2005 | Warek | |
| 2005/0039844 A1 | 2/2005 | Engwall et al. | |
| 2005/0061422 A1 | 3/2005 | Martin | |
| 2005/0236735 A1 | 10/2005 | Oldani et al. | |
| 2006/0127635 A1* | 6/2006 | Colson et al. | 428/105 |
| 2006/0162143 A1 | 7/2006 | Nelson et al. | |
| 2006/0169118 A1 | 8/2006 | Morehead | |
| 2006/0180264 A1 | 8/2006 | Kisch et al. | |
| 2006/0231682 A1 | 10/2006 | Sarh | |
| 2007/0044919 A1 | 3/2007 | Hoffmann | |
| 2007/0044922 A1 | 3/2007 | Mischler et al. | |
| 2008/0093026 A1 | 4/2008 | Naumann | |
| 2008/0105785 A1 | 5/2008 | Griess et al. | |
| 2008/0157437 A1 | 7/2008 | Nelson et al. | |
| 2008/0196825 A1 | 8/2008 | Hamlyn | |
| 2008/0202691 A1 | 8/2008 | Hamlyn et al. | |
| 2008/0216961 A1 | 9/2008 | Hamlyn et al. | |
| 2008/0216963 A1 | 9/2008 | Hamlyn et al. | |
| 2009/0311506 A1 | 12/2009 | Herbeck et al. | |
| 2010/0252183 A1 | 10/2010 | Munaux et al. | |
| 2011/0011537 A1 | 1/2011 | Hamlyn et al. | |
| 2011/0011538 A1 | 1/2011 | Hamlyn et al. | |

FOREIGN PATENT DOCUMENTS

| | | |
|---|---|---|
| DE | 10 2007 009 124 A1 | 8/2008 |
| EP | 0 216 695 A1 | 4/1987 |
| EP | 0 241 251 A1 | 10/1987 |
| EP | 0 557 158 | 8/1993 |
| EP | 0 626 252 | 11/1994 |
| EP | 0 753 394 | 1/1997 |
| EP | 0 773 099 A1 | 5/1997 |
| EP | 1 001 066 | 5/2000 |
| EP | 1 177 871 A2 | 2/2002 |
| EP | 1 342 555 A1 | 9/2003 |
| EP | 1 757 552 A2 | 2/2007 |
| FR | 1 590 718 | 5/1970 |
| FR | 2 050 498 | 4/1971 |
| FR | 2 254 428 | 7/1975 |
| FR | 2 624 786 | 6/1989 |
| FR | 2 686 080 | 7/1993 |
| FR | 2 721 548 | 12/1995 |
| FR | 2 784 930 | 4/2000 |
| FR | 2 865 156 | 7/2005 |
| FR | 2 882 681 | 9/2006 |
| FR | 2 913 365 | 9/2008 |
| GB | 2 268 705 A | 1/1994 |
| GB | 2 270 672 | 3/1994 |
| GB | 2 292 365 A | 2/1996 |
| JP | 01 281247 | 11/1989 |
| JP | 2005-007252 | 1/2005 |
| JP | 2005329593 | 12/2005 |
| WO | WO 95/20104 | 7/1995 |
| WO | WO 02/070232 | 9/2002 |
| WO | WO 03/0353080 A1 | 5/2003 |
| WO | WO 2006/060270 A1 | 6/2006 |
| WO | WO 2006/092514 A2 | 9/2006 |
| WO | WO 2008/149004 A1 | 12/2008 |
| WO | WO 2010/049424 A1 | 5/2010 |

OTHER PUBLICATIONS

File History for U.S. Appl. No. 11/740,057, filed Apr. 25, 2007.
File History for U.S. Appl. No. 11/740,060, filed Apr. 25, 2007.
File History for U.S. Appl. No. 11/740,064, filed Apr. 25, 2007.
File History for U.S. Appl. No. 12/434,253, filed May 1, 2009.
File History for U.S. Appl. No. 12/628,449, filed Dec. 1, 2009.
File History for U.S. Appl. No. 12/628,460, filed Dec. 1, 2009.
Application and File History for U.S. Appl. No. 11/740,055, filed Apr. 25, 2007, inventor Hamlyn.
Application and File History for U.S. Appl. No. 11/740,057, filed Apr. 25, 2007, inventor Hamlyn.
Application and File History for U.S. Appl. No. 11/740,060, filed Apr. 25, 2007, inventor Hamlyn.
Application and File History for U.S. Appl. No. 11/740,064, filed Apr. 25, 2007, inventor Hamlyn.
Application and File History for U.S. Appl. No. 12/434,253, filed May 1, 2009, inventor Munaux.
Application and File History for U.S. Appl. No. 12/628,449, filed Dec. 1, 2009, inventor Hamlyn.
Application and File History for U.S. Appl. No. 12/628,460, filed on Dec. 1, 2009, inventor Hamlyn.
International Search Report for International Application No. PCT/EP2010/054377 dated Jul. 2, 2010.
Application and File History for U.S. Appl. No. 12/628,460, filed Dec. 1, 2009, inventor Hamlyn.
Transaction History for U.S. Patent No. 6,490,990 Issued Dec. 10, 2002.

* cited by examiner

FIBER APPLICATION MACHINE

RELATED APPLICATIONS

This application is a U.S. National Stage Application filed under 35 U.S.C. §371 and claims priority to PCT Application No. PCT/FR2006/000496 filed Mar. 2, 2006, which claims priority to French Application No. 0502123 filed Mar. 3, 2005, the disclosures of which are hereby incorporated by reference.

TECHNICAL FIELD

The present invention concerns a fiber application machine including a fiber application head with an application roller for the production of parts made of composite materials. The present invention concerns more particularly an application machine fitted with a fiber tension limiting system and/or a particular application head and/or particular means for conveying fibers from fiber storing means to the application head, as well as a tension limiting system and an application head of this kind for a fiber application machine.

BACKGROUND OF THE INVENTION

Fiber application machines, commonly known as fiber placement machines, are known in particular through the document EP 0 626 252, in respect of the application to a mold of a strip formed of a number of fibers pre-impregnated with resin, the application roller coming into contact against the mold in order to apply the strip. The machine includes a gantry whereon an application head is mounted in order to allow it to move along a number of axes. Bobbins of pre-impregnated fibers are mounted on a creel joined to the robot, and conveyed from this creel to the application roller of the application head by specific conveying and guiding systems. Because of the adhesive aspect of resins, these conveying and guiding systems are particularly complex in design and tend to get clogged.

In order to guarantee that the pre-impregnated fibers unwind properly, and that the fiber width is substantially constant, the fibers are wound onto the bobbin with a separating film. The pre-impregnated fibers have a limited lifespan at ambient temperature and must be stored at temperatures of the order of −15° C. The placement machine must incorporate separating film removal systems which must guarantee a total and reliable removal of the separating film so as to prevent any risk of the manufactured part being polluted.

Current placement machines are proving to be particularly cumbersome and expensive. The different elements built onto the different displacement axes of the gantry or in the placement head, such as the bobbin creel, the conveying and guiding, cooling, and film removal systems, are cumbersome and heavy, and restrict the speed at which the fibers are applied. The machines do not allow fibers to be placed in parts of small dimensions or on some female molds because of the space requirement and the limited runs of the different axes.

Pre-impregnated fibers may have non-optimum mechanical characteristics, since the filaments constituting the fiber may be cut or discontinuous when the fiber comes from a pre-impregnated one-way slit strip, commonly known as "slit tape".

The pre-impregnated fibers deposited on the molds must be subject to intermediate compaction operations so as gradually to discharge the air trapped between the folds in the deposited fibers. These compaction operations are performed either by installing a vacuum cover, or by continuous pressure of the fiber placement head on the mold, or by a combination of both methods. In both cases, the lead times are extended and the machine has to be designed so that it can exert this pressure.

To make the composite part, the pre-impregnated fibers are subjected to a polymerization operation in a vacuum or in an autoclave. To guarantee low porosity in the final composite it is necessary to effect a polymerization in autoclave, which considerably increases the implementation costs.

In the case of fibers stored on a bobbin, the built-in creels include a motor-driven unwinding system associated with each bobbin. Each unwinding system is automatically controlled as a function of the fiber speed so as to limit its tension at the application roller in order to guarantee in particular that it is placed flat on the concave surfaces of the molds. Each unwinding system is also automatically controlled as a function of robot displacement so that in particular slack can be recovered by re-winding the fiber. Such unwinding systems take up significant amounts of space and are very expensive and significantly restrict the bobbin unwinding speed on account of the automatic control constraints, and therefore the speeds at which the fibers are deposited.

SUMMARY OF THE INVENTION

The purpose of the present invention is to overcome at least one of the aforementioned drawbacks by proposing in particular a fiber application machine which has a reduced space requirement, is of straightforward design and less expensive.

To this end, the purpose of the present invention is a fiber application machine that includes a system for moving a fiber application head comprising an application roller and means for guiding the fibers onto said application roller, fiber storing means, and fiber conveying means for conveying fibers from said storing means to the application head, characterized in that it additionally includes at least one tension limiting system placed between the fiber storing means and the application head, said tension limiting system comprising at least two mutually parallel cylinders, whereon a plurality of fibers are able to be partly wound, and drive means for rotating said cylinders, substantially at the same speed, said drive means being automatically controlled by a control unit of the machine, such that the peripheral speeds of the cylinders are higher than the moving speed of the fibers at the application roller, in order to exert a tensile stress on the fibers coming from the storing means, so as to limit the take-up tension of the fibers at the application roller to a substantially constant value, at whatever speed the fibers move.

The tension limiting system according to the invention allows a number of bobbins to be unwound or a number of balls of fiber to be unwound with a single automatic control, for fibers moving at different speeds at the application head. The tension limiting system allows the tension of the fibers at the roll to be reduced whatever their speed. The tension limiting system proves to be straightforward in design, not particularly cumbersome, and inexpensive when compared with individual prior art unwinding systems.

The machine may include a tension limiting system at the storing means output, and/or inserted on the conveying means, for example along the robot arm, and/or at the application head input, in which latter case the tension limiting system may be built into the robot end, or incorporated in the application head.

According to one embodiment, the cylinders are placed such that each fiber is able to be partly wound around each cylinder, so as to come into contact on the cylinders via its two principal surfaces, in order to guarantee that all the filaments constituting the fiber will be driven. Advantageously, each fiber comes against the cylinders via each of its surfaces over substantially identical lengths.

According to a first embodiment, the cylinders include annular grooves for receiving the fibers, the fibers coming directly into contact with the cylinders.

Given their fragility, their resilience or their tack, some fibers cannot be in direct contact on the cylinders in rotation. To employ such fibers, in particular fibers pre-impregnated with thermosetting resin, according to a second embodiment, belts are mounted around each cylinder of the tension limiting system, such that one belt becomes interleaved between each fiber and the cylinder, each belt being able to adhere to a fiber and to be driven more or less by the cylinder as a function of the pressure exerted by the fiber on the belt, said pressure being proportionate to the take-up tension on the fiber.

When the fiber is stopped, the pressure exerted by the fiber on a belt is nil, the belt is then in sliding contact with the cylinder. When the fiber moves forward, the fiber exerts pressure on the belt such that it is then driven by the cylinder, with a sliding between the belt and the cylinder proportionate to the pressure exerted by the fiber. The relative speed between the cylinder and the belt is therefore proportionate to the pressure exerted, the relative speed between the belt and the fiber being nil or very low.

Each belt can be mounted in a loop on a sliding path formed partly by the cylinder and additional means so as to limit the angular contact portion between the belt and the cylinder, the angular contact portion between a fiber and a belt being less than or equal to, preferably less than, the angular contact portion between the belt and cylinder.

According to one embodiment, said additional means include crescent moon shaped discs mounted fixed around the cylinders, such that the end parts come tangentially to fit to the cylinders, each belt being mounted around the circular peripheral edge of a disc and on the circumferential portion of the cylinder not covered by said disc. Each cylinder can be fitted with discs laid flat against each other, there being guiding flanges between two adjacent discs and against the outer discs, so as to guide the belts and the fibers.

According to one particular embodiment, each belt is formed of two layers of different materials.

The drive means can be controlled such that the peripheral speed of the cylinders is 20 to 40%, for example about 30%, faster than the highest fiber movement speed.

The use of one or more tension limiting systems makes it possible to have conveying systems that are straightforward in design with a small space requirement, and thereby to obtain high movement speeds. According to one embodiment, the fiber conveying means include flexible tubes, each flexible tube being able to receive a fiber into its inner channel, a flexible tube being mounted fixed by its ends between a tension limiting system and the storing means and between a tension limiting system and the application head, for example by a ramp system, the limiting system or systems placed upstream of the application head then allowing the tensions due to friction of the fibers in the flexible tubes to be limited or eliminated.

The flexible tubes are of sufficient length and flexibility not to restrict the robot in its movements. By using flexible tubes according to the invention, of constant length, possibly brought together in one or more pipes, it is no longer necessary to provide for a slack recovery system when the robot moves. Furthermore, the fibers are isolated in the tubes and the tubes can be cooled, for the employment for example of pre-impregnated fibers, the adhesive aspect of which diminishes with the temperature.

The flexible fiber conveying tubes will preferably be of rectangular cross-section, so as to increase flexibility and reduce the space requirement, particularly in the case of fibers of great width. To advantage, the flexible tubes are constituted by a plastic material, preferably high-density polyethylene, better still high-density anti-static polyethylene.

The straightforward nature of the fiber conveying allows displacement systems to be proposed that are formed from different straightforward modular robotized sub-assemblies that can be adapted in a cost-effective way to the manufacture of parts of different dimensions.

The displacement system is able to displace the application head in at least three directions perpendicular to each other. Said displacement system comprises for example a robot that includes a multi-articulated wrist or arm at the end of which said application head is mounted. The displacement system may be formed for example by a standard robot of the multi-articulated type, placed on the floor or mounted on a linear axis or a gantry.

The fiber storing means may include racks in the case of fibers packaged in the form of balls or in cartons, and/or a creel in the case of fibers packaged in the form of bobbins. These storing means may be placed on the floor, for example in the case where the robot is fixed, or mounted on an element of the displacement system, such as a carriage on a linear axis.

The tension limiting system according to the invention can be built into a machine without or with on-line impregnation, in which latter case said machine includes means for applying resin to each dry fiber.

According to a first embodiment, said resin application means are placed between the dry fiber storing means and the tension limiting system, the flexible tubes between them being cooled so as to reduce or eliminate the adhesive aspect of the fibers as they leave the resin application means.

According to a second embodiment, said machine is fitted with a head allowing on-line resin impregnation of the dry fibers, the resin application means are then built into the fiber application head, and are able to apply resin to the fibers as they leave the guiding means. The fiber application head allows dry fibers and resin to be employed, the dry fibers being coated with resin just before they are deposited on a mold. The fibers may be packaged without a separating film, for example in the form of balls, bobbins or in cartons. The application of the resin upstream from the guiding means prevents any risk of their clogging, and additionally allows guiding means to be proposed that are straightforward in design and with a small space requirement. The application head allows the fibers to be coated with resin to give structures formed of fibers partly impregnated with resin, with a given fiber content, for example 55% by volume of fiber, from which composite parts will be made using the method commonly known as RFI (Resin Film Infusion). This RFI method, whereby the resin infuses through the fibers to impregnate them, allows a low porosity composite part to be obtained, with no polymerization stage in an autoclave. The inventive application head may also be used to coat the fibers on-line with a small quantity of adhesive or resin, for example between 5 and 20 g/m$^2$, just enough to keep the fibers in place and to make a dry preform, from which a composite part will be made using the method of injecting or infusing resin in a dry preform, commonly known as RTM (Resin Transfer Molding). An RTM method of this kind, whereby the resin of the end part is injected or infused during a subsequent phase, makes it possible to use resins employed only in a closed mold, for example resins with volatile organic compounds, and to obtain specific surface states on all surfaces of the end part. It is also possible to combine both aforementioned application types for one and the same composite part.

The machine according to the invention offers the possibility of using a great variety of fibers, synthetic or natural, hybrid or non-hybrid, particularly fibers currently employed in the field of composites, such as glass fibers, carbon, quartz and aramid fibers, as well as a great variety of thermosetting or thermoplastic resins, single or multi-compound, whether or not reinforced with additives such as nano-composites or plasticizers improving the properties thereof, in particular high viscosity resins that allow the fibers to adhere to the molds with no risk of runoff or sliding, and more particularly resins without solvent, and particularly heat-fusible resins of high viscosity when cold which will properly impregnate the fibers during a subsequent vacuum infusion phase. The resin may be packaged for example in liquid form, in paste form or in solid form, particularly as flakes or granules.

According to another embodiment, the resin application means include a plurality of dispensing channels arranged facing said application roller so that resin can be applied to the surface of the fibers opposite the application roller, said application means being able to coat said surfaces with resin in the form of a film, of constant thickness or porous, and/or to deposit resin on said surfaces in the form of a bead. The resin application means include to advantage one dispensing channel per fiber, guaranteeing a presence of resin on a single surface, without overflowing over the edges, so as to prevent any problem with polluting the application roller, and guiding means, whatever the orientation of the application head.

Said resin application means may include at least one lip nozzle fitted with a foil defining a plurality of dispensing channels, and/or a plurality of tubular nozzles, each defining a dispensing channel for a fiber, that are possibly disposable, and mounted for example on one and the same ramp.

According to another embodiment, the machine includes dosing means able to supply said resin application means of the placement head with resin at a flow rate controlled as a function of the fiber displacement speed, said dosing means being automatically controlled by a control unit of the machine. The dosing means may be built into the application head or placed on the displacement system, for example along the robot arm. Said dosing means may include at least one volumetric pump comprising a dosing chamber with an outlet, a piston mobile in the dosing chamber, and means for actuating said piston, such as a hydraulic or electric jack, automatically controlled by the control unit.

According to another embodiment, the machine additionally includes storing and supply means able to store resin and supply said dosing means with resin. The resin storing and supply means will be adapted to the different forms of packaging and volumes of the resins used. The resin storing and supply means may include melters, drum emptiers, or pressurized vessels, kept away from the head by conveying the resin in at least one conveying tube kept along the displacement system without limiting the movements of the different axes of the displacement system. In the case of multi-compound resins, each compound is conveyed in its own pipe and the mix is performed at the application head. These storing means may be placed on the floor or built into an element of the displacement system, for example on a linear axis by means of a carriage.

The application head can include cutting means able to cut, possibly individually, the fibers, and re-routing means able to reroute, possibly individually, each fiber that has just been cut, said cutting means and re-routing means being placed upstream of the resin application means. According to one embodiment, said guiding means include for each fiber, ducts, preferably of circular transverse cross-section, between which the cutting means and the re-routing means are placed. The absence of resin on the fibers allows simple ducts of circular cross-section to be used, that may include angled parts.

According to one embodiment, the re-routing means include drive systems with rollers and kicking rollers, and air injection means for the injection of compressed air or any other type of gas into one of said guiding ducts, to create an airflow in the direction of the application roller from downstream to upstream, said means being placed for example downstream from the cutting means to suck up the fibers that have just been cut. The airflow is preferably conditioned, in other words temperature and/or humidity controlled, and purified to prevent the fibers from being polluted.

According to another embodiment, the placement head additionally includes cooling means for cooling the resin that has just been applied to the fibers to prevent them from adhering to the application roller. The cooling means are able, via a cold airflow for example, to cool the application roller in order to cool the fibers coming against said application roller downstream from the application means and/or directly the fibers, downstream or upstream from the application means.

Another purpose of the present invention is a tension limiting system, as defined previously, intended to be fitted to a fiber application machine with or without resin application means, a fiber winding machine and/or a weaving machine in particular of the multi-axial type. In the case of pre-impregnated or pre-coated fibers, depending on the nature of the resin used and the type of tension limiting system used, in other words with or without interleaved belts, the fibers may possibly be fitted with a separating film on at least one principal surface.

Another purpose of the present invention is a fiber application machine that includes a fiber application head displacement system comprising an application roller and means for guiding the fibers onto said application roller, fiber storing means, and fiber conveying means for conveying fibers from said storing means to the application head, wherein the fiber conveying means include flexible tubes as defined previously, each tube being able to receive a fiber in its inner channel, said machine possibly being fitted with one or more tension limiting systems as defined previously. As described previously, such conveying means make it possible in particular to eliminate motor-driven slack recovery systems for bobbins of fiber, to isolate fibers from the outside and to simplify the application head displacement system. The flexible tubes can be of rectangular cross-section and/or are constituted by high-density, preferably anti-static, polyethylene.

Another purpose of the present invention is a fiber application head, intended to be mounted at the end of a displacement system, and fitted with resin application means, as defined previously, said head comprising an application roller, means for guiding the fibers onto said application roller, and resin application means able to apply resin to the fibers as they leave the guiding means, as well as a fiber application machine fitted with an application head of this kind, with or without a tension limiting system.

BRIEF DESCRIPTION OF THE DRAWINGS

The invention will be better understood, and other purposes, details, characteristics and advantages will emerge more clearly from the following detailed explanatory description of currently preferred particular embodiments of the invention, with reference to the appended diagram in which.

DETAILED DESCRIPTION OF THE DRAWINGS

Figure 1:
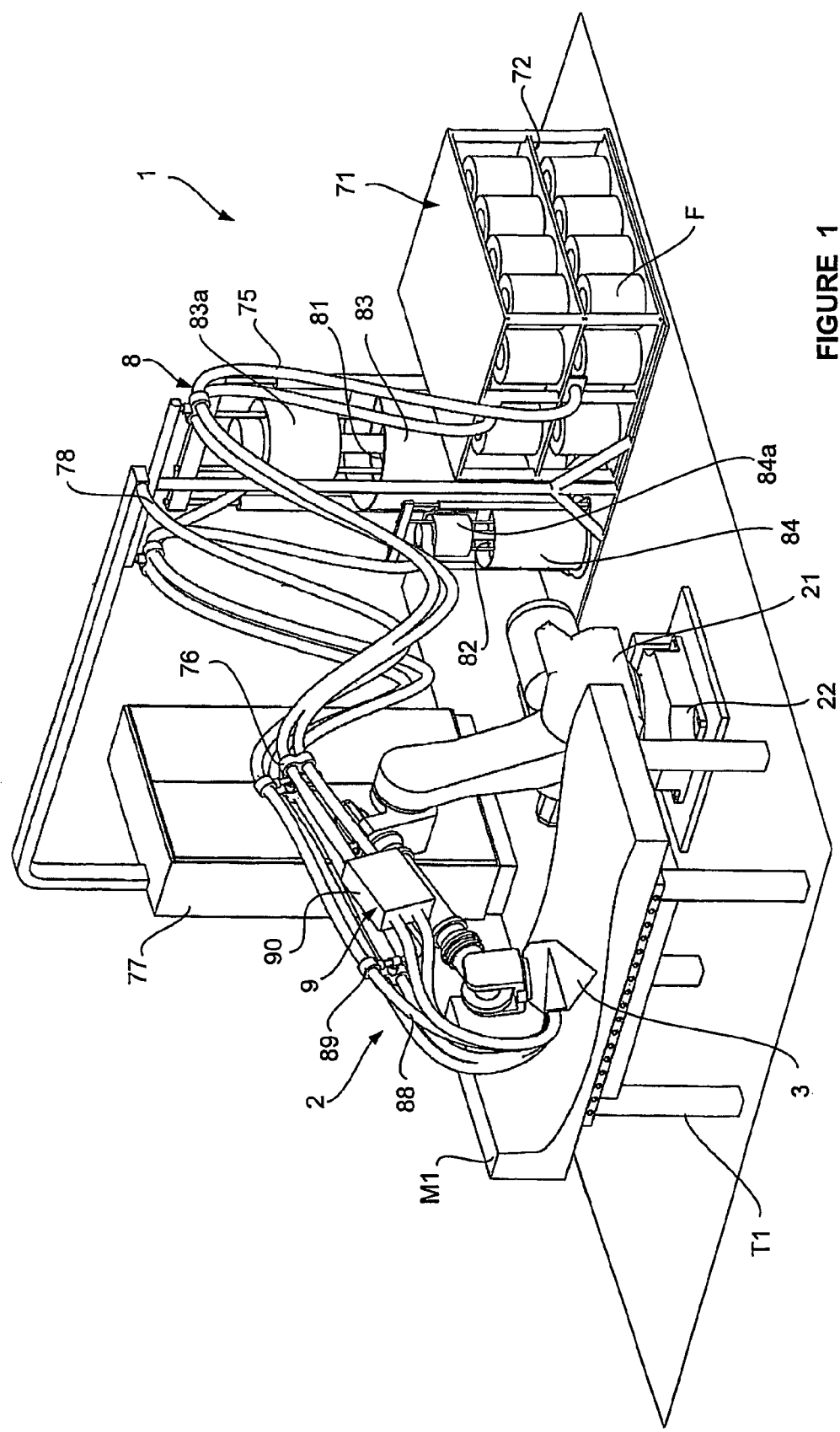
FIG. 1 is a perspective view of a placement machine according to a first embodiment.

With reference to FIG. 1, the placement machine 1 includes a displacement device formed of a robot 2 of the six axis type, known per se, a placement head 3 mounted at the end of the multi-articulated arm 21 of the robot, fiber storing means, fiber conveying means for conveying fibers F from said storing means to the placement head 3, resin storing means 8 and a tension limiting system 9.

Figure 2:
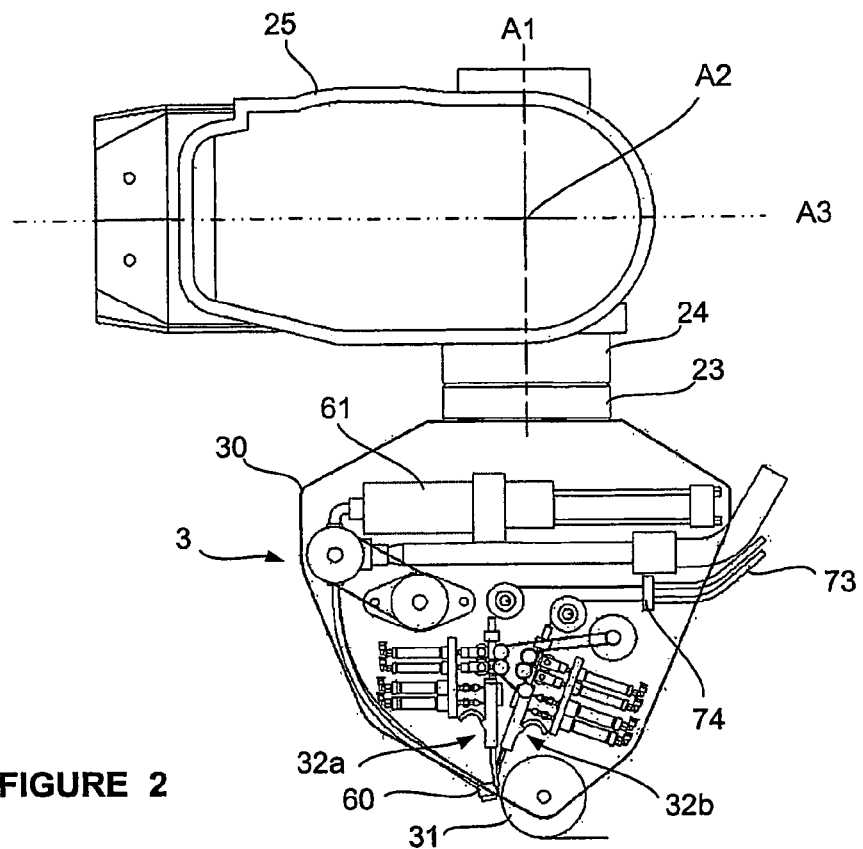
FIG. 2 is an enlarged diagrammatic side view of the placement head of the machine in FIG. 1.

The robot 2 includes a fixed base plate 22 placed in proximity to support means, formed of a receiving table T1, supporting a mold M1 on which the composite part is to be made. The robot arm 21 is mounted mobile in rotation on this base plate 22 and includes different portions mounted to rotate around each other. The wrist part of the arm 21, shown in FIG. 2, includes the last three arm sections 23, 24, 25 assembled around axes of rotation A1, A2, including an assembly deck 25 at the end. The wrist part is mounted to rotate on the remainder of the robot 2 along an axis A3. The placement head 3 is mounted in a fixed way on the assembly deck 25 along the axis A1 also known as the assembly axis.

In the present embodiment, the fibers F are of the glass fiber type, and are packaged in the form of balls that unwind from the center. The fiber storing means are formed of simple racks 71 placed on the floor in proximity to the robot base plate 22, the balls of fiber being laid side by side on the trays 72 of the racks 71. As a variant, textile fibers are packaged in cartons arranged on the rack trays 72. So that the fibers do not become charged with static electricity and so that they become supple, humidity control means may be provided in said storing means, for example in order to obtain a humidity measurement set at about 70% of relative humidity.

Figure 13:
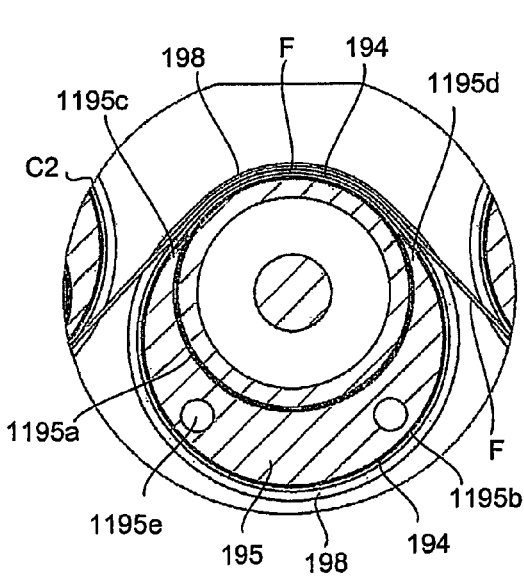
Figure 14:
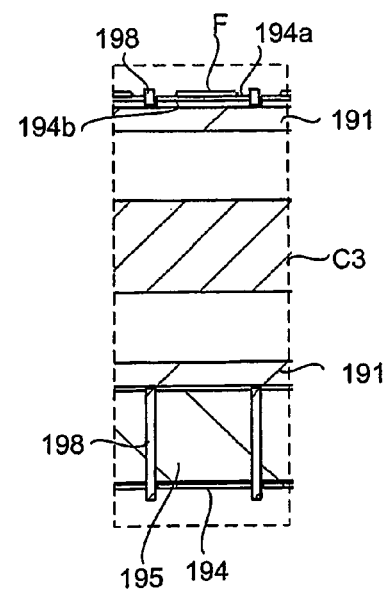

The fibers F are conveyed individually from the racks 71 to the placement head 3 in flexible conveying tubes 73 shown diagrammatically in FIGS. 2 to 5. The conveying tubes 73 are connected at the end to ramps 74 by means of quick-action connections. A ramp 74 is mounted on the casing 30 of the placement head 3, the conveying tubes 73 being assembled on the ramp 74 in two stacked rows to form two layers of threads, a first layer of fibers F1 and a second layer of fibers F2. A ramp is also provided to anchor the conveying tubes 73 to each tray 72 in the rack 71. The conveying tubes 73 are of sufficient length and flexibility not to restrict the movements of the robot 2 and the placement head 3. To protect them and keep them along the robot arm 21, the conveying tubes 73 are passed into pipes 75 held on the arm by fastenings 76 commonly used in the field of robotics, for example into two pipes, each pipe bringing together a bundle of conveying tubes 73 corresponding to a layer of fibers F1, F2. The conveying tubes 73 are made out of a material which does not break the fibers F, does not charge the fibers F with static electricity, causes little friction, does not create turns, resists wear and has good fatigue and repeated bending strength. In this embodiment, the conveying tubes 73 are of circular cross-section, their diameter being adapted to suit the fibers F. For fibers from 600 to 2400 tex, the conveying tubes 73 have for example an internal diameter of 8 mm and an external diameter of 10 mm. The conveying tubes 73 are made of a polymer material, such as a natural high-density polyethylene, including an anti-static additive. According to one embodiment variant described below with reference to FIGS. 9 and 13, the conveying tubes 73 are of rectangular cross-section.

With reference to FIGS. 2 to 5, the placement head 3 includes a casing 30 wherein are mounted a flexible application roller 31, and two guiding duct systems 32a, 32b, offset angularly, to guide the two layers of fibers F1, F2 in the direction of the application roller 31, these two layers F1, F2 being brought tangentially to the application roller 31 such that the fibers of one layer become interleaved between the fibers of the other layer to form a strip of fibers. The application roller 31 is mounted to rotate between two flanges of the casing 30. It is made of an elastomer material coated with an anti-adhesive material, for example Teflon®.

Each layer of fibers F1, F2 is directed from the ramp 74 to its guiding system 32a, 32b by a set of return pulleys 33 mounted loose on an axis 34 assembled in the casing 30 parallel to the axis of the application roller 31. A first guiding system 32a, intended to guide the first fiber layer F1, is placed parallel to the axis of assembly A1 of the placement head 3 on the deck, i.e. vertically in FIGS. 2 and 5, the second guiding system 32b being placed above the application roller 31, at about 15° from the first guiding system 32a. For each guiding system 32a, 32b, each fiber passes in different ducts 35-38 aligned and separated longitudinally from each other so that an individual cutting system and an individual re-routing system can be set out. Each cutting system includes a plane blade 39 mounted at the end of the shaft 40a of a pneumatic jack 40, facing a counter-tool 41. The pneumatic jack 40 is able to displace the blade 39 between two ducts 36 and 37, between a rest position wherein the blade 39 is separated from the fiber and an active position wherein the blade 39 is stopped against the counter-tool 41 in order to cut the fiber.

Each re-routing system includes a drive roller 42 and a kicking roller 43 made of elastomer mounted at the end of the shaft 44a of a pneumatic jack 44. The jack 44 is able to displace the kicking roller 43, between two ducts 35 and 36, between a rest position wherein the kicking roller 43 is separated from the fiber and an active position wherein the kicking roller 43 flattens the fiber against the drive roller 42 in order to make the fiber move forward.

For reasons of space requirement, the re-routing systems are arranged in staggered rows in two parallel stacked rows. Likewise, the cutting systems are arranged in staggered rows in two stacked rows, downstream from the re-routing systems. The control jacks 40, 44 of the cutting systems and re-routing systems are mounted perpendicularly on one and the same support plate 45 placed parallel to the ducts 35-38 of its associated guiding system, and on the side of said ducts 35-38 opposite the other guiding system. The drive rollers 42 of the re-routing systems of one and the same row are formed by a single drive roller 42. For both fiber layers, F1, F2, the head 3 includes four rollers brought together between the guiding systems 32*a*, 32*b* and rotated via a belt 47 by a single motor 46 built into the placement head 3.

Figure 6:
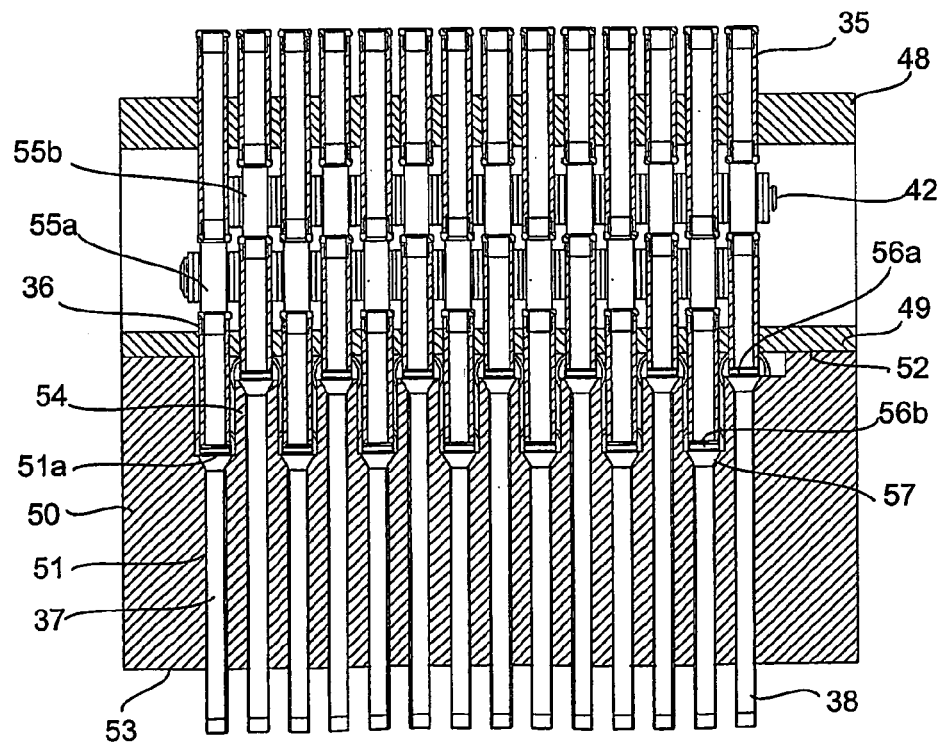
FIG. 6 is a view along the cross-section plane VI-VI in FIG. 5.
Figure 3:
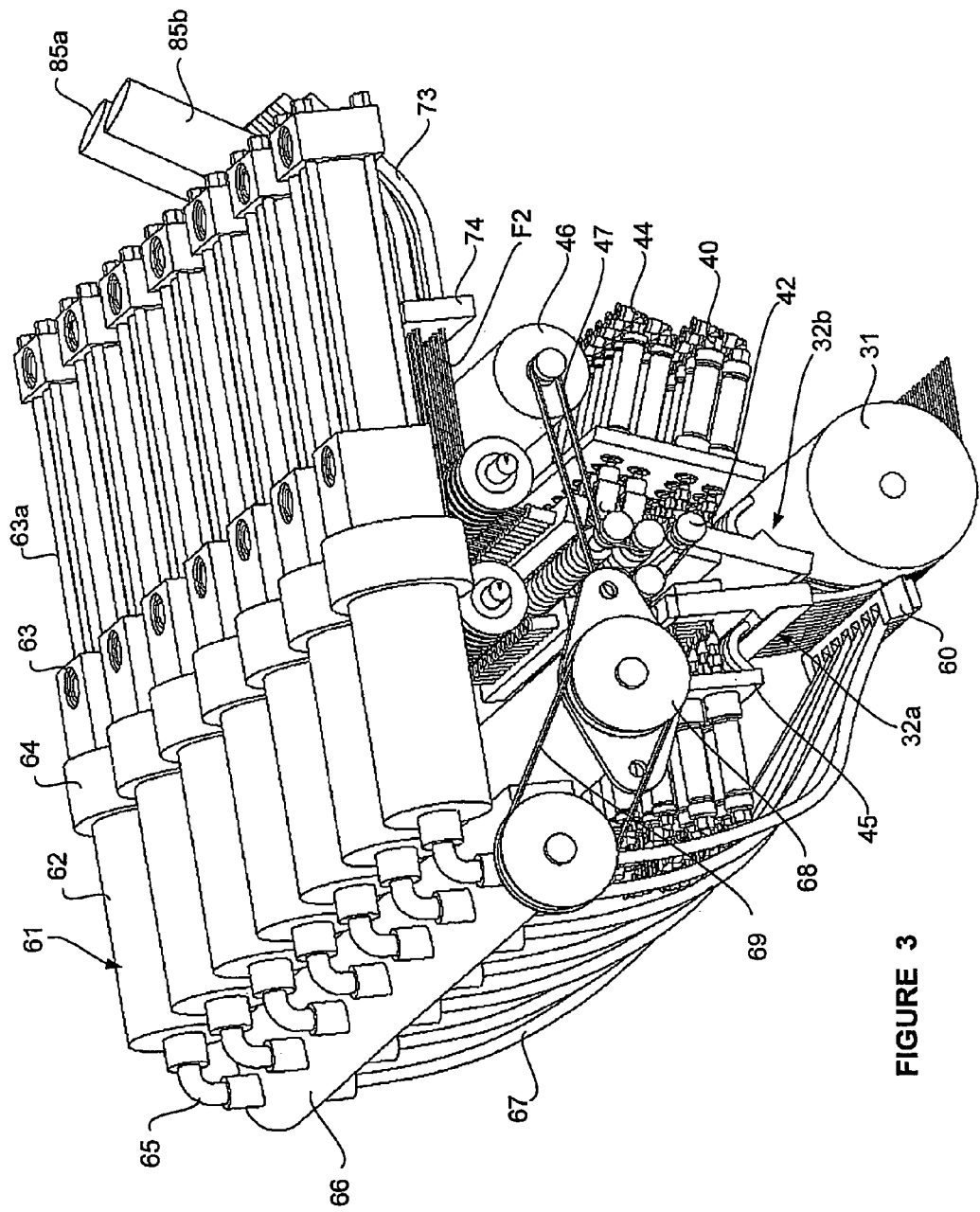
FIGS. 3 and 4 are two enlarged perspective views of constituent elements of the placement head in FIG. 2.
Figure 4:
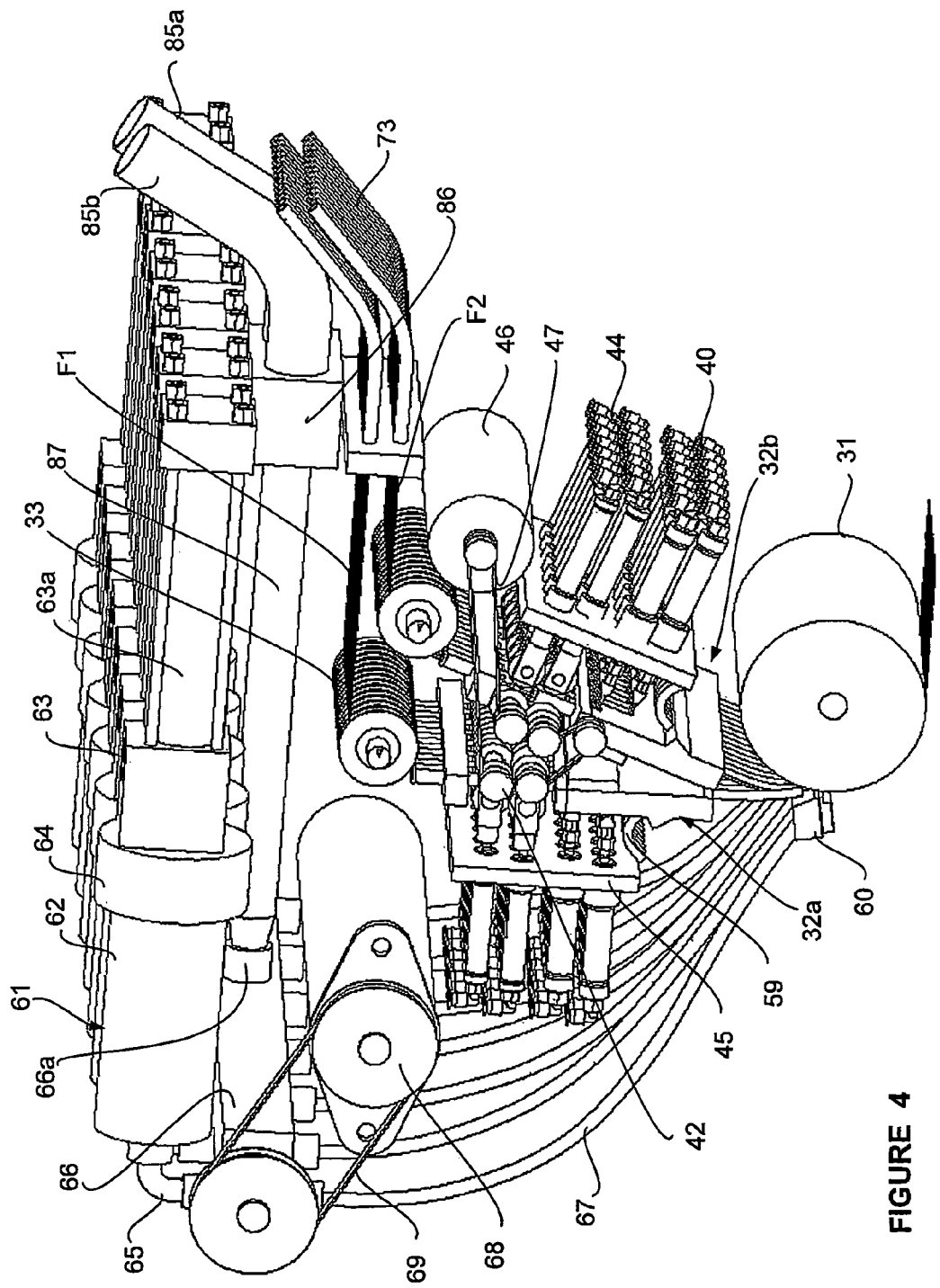

In the embodiment shown in the figures, each fiber passes into a first so-called input duct 35, then a first intermediate duct 36 and a second intermediate duct 37 and finally into an angled output duct 38. With reference to FIG. 6, the input ducts 35 are formed of metal tubes of circular cross-section mounted parallel to each other on one and the same first support bar 48 integral with the casing 30. The second intermediate ducts 37 are formed by a parallelepiped plate 50 fitted with bores 51 of circular cross-section emerging on the two parallel longitudinal edges 52, 53 of the plate. The plate includes on one of its edges, the so-called upper edge 52, a set of teeth 54 such that the bores 51 emerge on two different levels, the longitudinal offsetting of the input orifices 51*a* of two adjacent bores corresponding to the longitudinal offsetting of two adjacent cutting systems. The first intermediate ducts 36 are formed of metal tubes of circular cross-section mounted parallel to each other on a second support bar 49, assembled on the upper edge 52 of the plate 50. The first intermediate ducts 36, of identical lengths, are separated on the one hand from the input ducts 35 in order to define two sets of spaces 55*a* and 55*b*, arranged in staggered rows, for the kicking rollers 43 of the two rows of re-routing systems to pass through, and on the other hand from the input orifices 51*a* in order to define two sets of spaces 56*a*, 56*b*, arranged in staggered rows, for the blades 39 of the two rows of cutting systems to pass through. Each bore 51 has in its input orifice 51*a* a countersink defining a truncated cone shaped guiding wall 57 to facilitate the re-routing of the fiber that has just been cut. The counter-tools 41 of the systems for cutting the fibers of one and the same layer are constituted by a single and same counter-plate anchored to the surface of the plate opposite the control jacks 40. The output ducts 38 are formed of metal tubes of circular cross-section fitted into the bores 51 through the lower edge 53 of the plate 50, as far as the countersinks. These output tubes have angled end parts 38*a*. The angled parts of the first guiding system 32*a* become interleaved between those of the second guiding system 32*b* such that the output orifices of the output ducts 38 are substantially aligned. The wall thickness of the output ducts 38 is small such that the fibers F coming from the two guiding systems 32*a*, 32*b* form a strip of fibers F wherein the fibers are placed substantially edge to edge. In the first embodiment, the strip includes 28 fibers, each guiding system conveying 14 fibers. While they are being conveyed, the fibers F may be slightly bent against the inner tubular wall of the guiding ducts 35-38. Clearly, two guiding systems could be arranged so that just one of them has angled end parts, the other including only rectilinear ducts.

Figure 5:
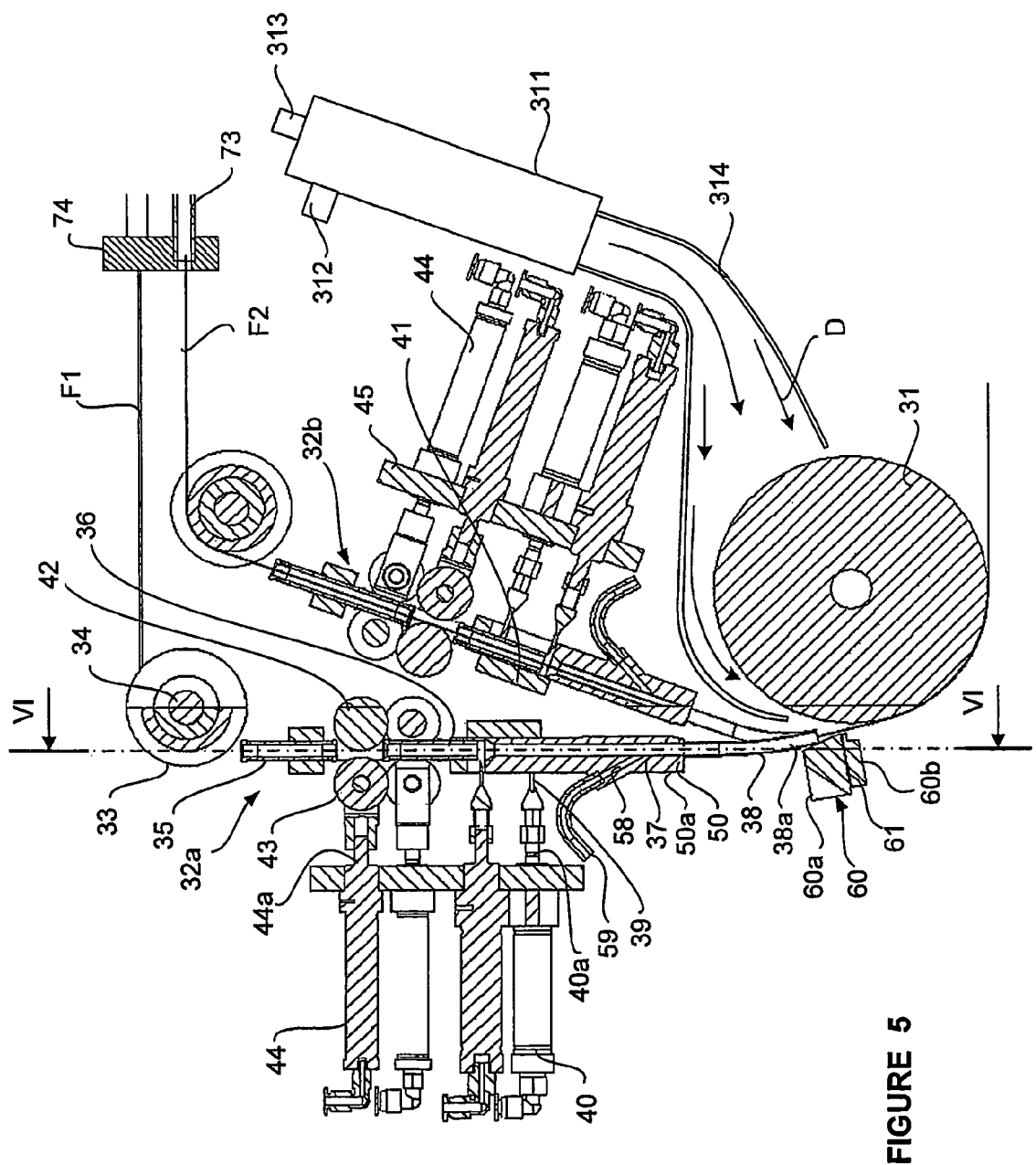
FIG. 5 is an enlarged cross-section view of the guiding means in FIG. 2.

With reference to FIG. 5, the support plate 50 includes compressed air supply channels 58 emerging in the bores 51 and the external principal surface 50*a*. These channels 58 are supplied individually with conditioned compressed air through conduits 59, partly shown in FIGS. 2 to 5, and are orientated so as to form an airflow in the direction of the output ducts 38, in order to suck up the fibers F that have just been cut. As a variant, these compressed air supply channels 58 are arranged upstream of the cutting means, for example at the level of the first intermediate tubes 36, the airflow then allowing the fibers F to be orientated towards the input orifices 51*a* of the bores 51.

A nozzle 60 is mounted in the casing 30 for example by its ends, parallel to the application roller 31, in order to coat each fiber with resin as it leaves the output ducts 38. The nozzle 60, commonly known as a lip nozzle, includes in a way known per se, two bars 60*a*, 60*b* clasping a foil. The foil is fitted with transverse slits, evenly spaced out extending up to its longitudinal outer edge in order to form dispensing channels, whereon emerges a longitudinal groove formed on the inner contact surface of one 60*a* of the two bars 60*a*, 60*b*.

In the present embodiment, the longitudinal groove is separated, for example using an elastomer block, into seven sections each emerging on four dispensing channels. The upper bar 60*a* includes seven transverse channels emerging on the longitudinal groove and connected by supply conduits 67 to dosing pumps 61, also known as volumetric pumps, in order to supply each section of the groove individually with resin.

Each dosing pump 61 includes a cylinder 62, delimiting a dosing chamber and fitted at a first end with an outlet for dispensing resin, a piston mounted to slide in the dosing chamber through the second open end of the cylinder, and an actuator able to displace said piston-linearly. The actuator is constituted by a hydraulic jack or an electric jack 63. The body 63*a* of the jack 63 is assembled on the pump cylinder by quick-action assembly means, of the ring type 64, and the jack shaft extends into the dosing chamber and carries at the end the pump piston. The pump outlets are connected via output conduits 65 to a system of two position valves 66, commonly known as a dispensing tank. This dispensing tank 66 makes it possible on the one hand, in a first position, to connect the dosing pumps 61 individually to the supply conduits 67 connected to the nozzle 60 in order to supply the different sections of the nozzle 60, and on the other hand, in a second position, to connect said output conduits 65 to a common input 66*a* of the tank 66 connected to resin storing and supply means 8 in order to re-supply the dosing pumps 61 with resin. The dispensing tank 66 is displaced between its two positions by a built-in motor 68 via a belt 69.

In this embodiment, the resin storing and supply means 8 are provided for the employment of a two compound resin. Each compound is stored in a drum 81, 82 placed in a drum emptier 83, 84, known per se, incorporating pumps 83*a*, 84*a* and is conveyed in its own supply tube 85*a*, 85*b* (FIG. 4) to the placement head 3. The supply tubes 85*a*, 85*b* are connected to the inputs of a two compound valve 86, placed upstream of a static mixer 87 which guarantees a homogeneous mixture of the two compounds, this static mixer 87 being connected at the output to the input 66*a* of the dispensing tank 66. To protect them and keep them along the robot 2, the two resin supply tubes 85*a*, 85*b* are passed into pipes 88 (FIG. 1) held by fasteners 89 similar to those fastenings 76 used for the fiber conveying tubes 73.

The placement head 3 includes cooling means to cool the application roller 31, in order to cool the fibers F coming against said roller 31 on leaving the nozzle 60 thereby preventing the resin from adhering to the application roller 31. As shown diagrammatically in FIG. 5, the cooling means include a cold air gun 311 placed over the application roller 31. This vortex type cold air gun 311 is supplied with compressed air via an inlet 312. This compressed air, for example at a pressure of about 6 bars, is converted into a hot airflow expelled outwards through an outlet 313, and a cold air flow, at about −40° C., shown diagrammatically by the arrows marked as D, directed towards the application roller 31 by a jet or deflector 314. The deflector 314, made of sheet metal or a plastic material, extends substantially over the entire length of the application roller 31 to allow the entire fiber strip to be cooled. The deflector 314 may be separated from the application roller 31 to form with the latter a channel allowing the cold airflow D to be orientated in the direction of the fibers F, downstream from the output conduits 38. Preferably, the deflector 314 comes substantially to the level of the surface of the application roller 31, the fibers F possibly being cooled directly by means of the compressed air flow coming from the aforementioned channels 58.

As a function of the type of resin to be applied, the placement head 3 can include heating means to heat the resin circulating in the placement head 3 to its working temperature, before it is applied to the fibers. These heating means, not shown in the figures, are presented for example in the form of electrical resistances built into sleeves and arranged around the dosing pumps 61, the dispensing tank 66, the static mixer 87, the supply conduits 67 and the nozzle 60.

The machine 1 includes a control unit, for example placed in a control box 77, able to control the robot movements in accordance with programmed sequences, and the jacks 40, 44, 63 of the cutting systems, re-routing systems and dosing pumps, as well as the motor 46 controlling the drive rollers 42, the motor 68 controlling the dispensing tank 66, and the drum emptier motors and pumps 83a, 84a. The electrical, pneumatic and/or hydraulic circuit for controlling the systems built into the placement head 3 are placed in a pipe 78 extending from the placement head 3 to the control box 77, along the robot arm 21.

As a function of the resin tack and viscosity, as well as the fiber content and the quantity of resin to be deposited the resin will be applied in the form of a film, which may or may not be porous, by contact between the fibers F and the nozzle 60 or in the form of a bead, without contact between the fiber and the nozzle 60. The nozzle 60 may be mounted mobile between a retracted position and an active position, the displacement between its positions being for example controlled by a jack system. The fibers F may be passed over a tensioning bar so that the fibers F in the layer can be more effectively flattened, edge to edge, before they are passed to the application roller 31, and preferably before the resin is applied.

The forward speeds of the shafts of the dosing pump jacks 63 are controlled by the robot machine control unit so as to regulate throughput as a function of the fiber movement speed, thereby guaranteeing a substantially constant resin content over the whole length of the fibers F, and particularly a bead of constant cross-section, whatever the speeds and directions of displacement of the robot 2.

In the present embodiment, each dosing pump 61 is used to apply resin to four adjacent fibers. The jacks 40, 44 of the cutting and re-routing systems are thereby controlled in groups of four. During an operation to cut four fibers, the jacks 40 of the four adjacent corresponding cutting systems are controlled in order to bring the blades 39 to their active position. Because of their longitudinal offset, the controls of two adjacent cutting systems will be slightly offset in time. After a time delay, which is a function of the displacement speeds of the four fibers that have just been cut, the forward movement of the jack 63 of the dosing pump 61 associated with these fibers is stopped. To avoid a problem with drops of resin leaving the nozzle 60 onto the fibers F, the dosing pump jack 63 can be controlled so as to displace the pump piston in the reverse direction. The jacks 44 of the kicking rollers 43 of the four re-routing systems are then actuated in order to press the fibers F against the corresponding drive rollers 42, and to re-route them to the application roller 31, for example just upstream from the nozzle 60. During this re-routing operation, compressed air is injected into the corresponding channels 58. Compressed air may also be injected continuously, as soon as the machine 1 is set in motion.

As a variant, resin is applied independently to each fiber by an individual dosing pump 61, the jack 63 of each pump 61 then being automatically controlled as a function of the speed at which the fiber moves. The cutting and re-routing systems can then be automatically controlled in a totally independent way.

All the dosing pumps 61 may be re-supplied between two draping phases, as soon as one of the dosage pumps 61 drops below a given filling threshold. The dosing chambers are filled by activating pumps 83a, 84a built into the drum emptiers 83, 84, and controlling the motor 68 so that it moves the dispensing tank 61 to its second position, the dosing pump jacks 63 being simultaneously actuated in order to retract the pistons during filling. As a variant, the dosing pumps 61 may be re-supplied by three-way valves individually controlled by the control unit.

Different dosing means and different application means may be employed as a function of the properties of the dosing resins, particularly their reactivity, rheology and viscosity. When the quantity of resin deposited is small and/or the resin has significant reactivity, resin may be supplied by means of disposable resin cartridges that can be loaded into the dosing chambers of the aforementioned dosing pumps 61. The disposable cartridges may be replaced once empty. In this case, the dosing pumps 61 may be connected directly to the lip nozzle 60, without providing a dispensing tank for re-supplying the dosing pumps 61. The lip nozzle 60 can be replaced by disposable tubular nozzles aligned alongside each other on a support ramp, each fiber having its own nozzle supplied independently via a supply conduit by a dosing pump 61 as described previously. The pump 61 can be placed remotely, outside the placement head, on the robot arm 21, via twenty-eight supply conduits 67 of great length extending along the robot arm as far as the tubular nozzles.

Figure 7:
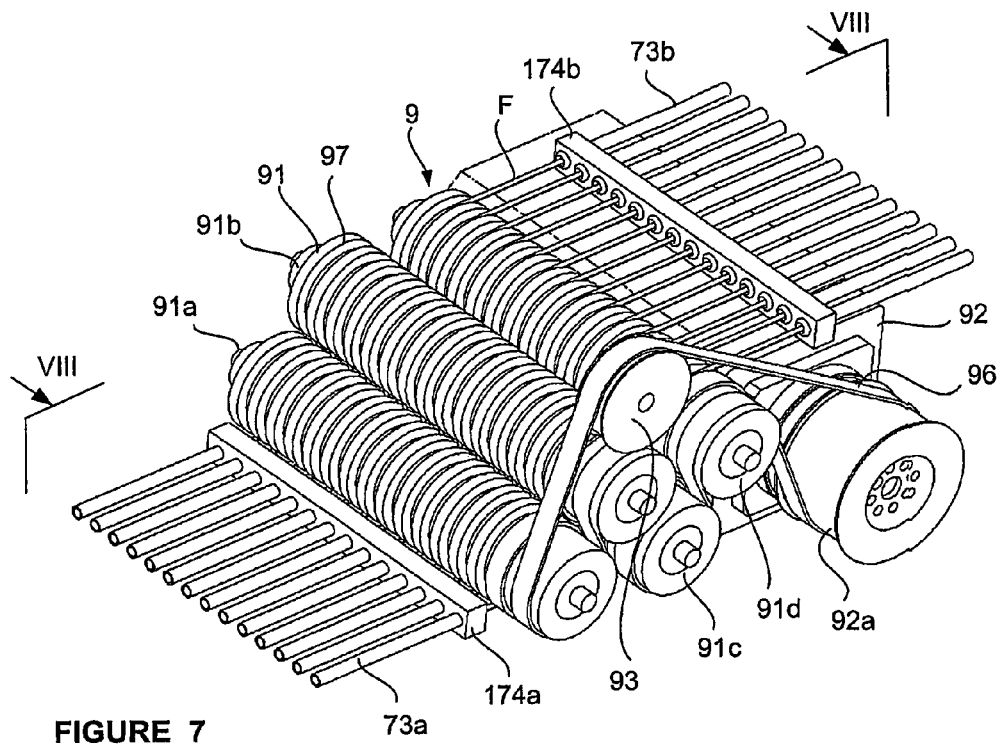
FIG. 7 is a perspective view of the constituent elements of the tension limiting system according to a first embodiment.
Figure 8:
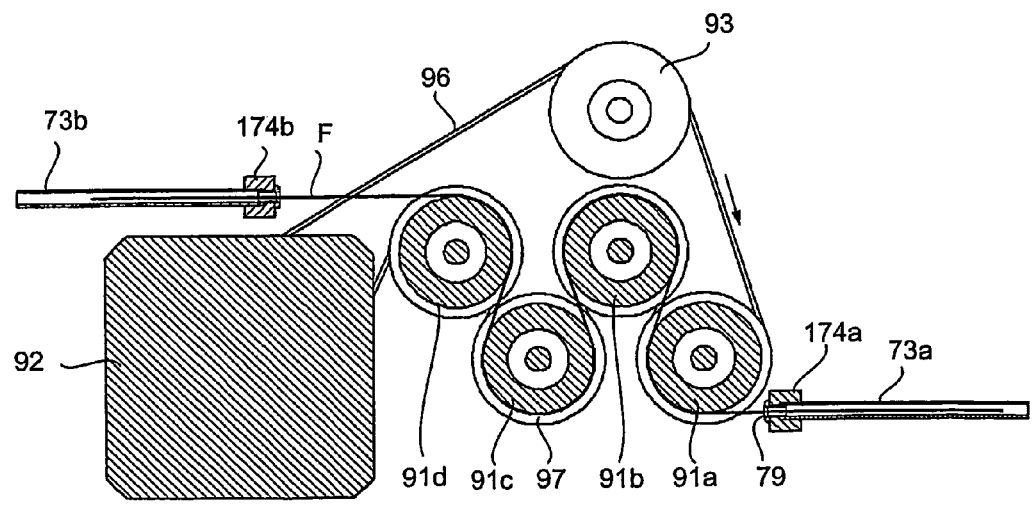
FIG. 8 is a view along the cross-section plane VIII-VIII in FIG. 7.

A tension limiting system 9, also called a feeder, is provided in order to exert a tensile stress on the fibers F coming from the balls thereby restricting the take-up tension of the fibers F at the application roller 31. In the present embodiment, the machine 1 includes two feeders inserted on the fiber conveying tubes 73 along the articulated robot arm 21, each feeder 9 being provided to treat one layer of fourteen fibers. With reference to FIGS. 7 and 8, each feeder 9 includes a set of motor-driven cylinders 91, mounted to rotate parallel to each other in a casing 90, on which the fibers F pass without going right round it. The two feeders can be built into one and the same casing 90, as shown in FIG. 1. Fibers currently used in composite materials generally come in the form of ribbons, with or without turns. Each fiber comes into contact with the cylinders 91 by its two principal surfaces, over substantially identical lengths for each of its principal surfaces. The contact of the cylinders 91 with the upper surface and the lower surface of the fiber allows the frictional force of the cylinders 91 on the fiber to be homogenized thereby guaranteeing that all the filaments constituting the fiber will be taken up.

The number of cylinders 91 and the diameter thereof are determined by the take-up tension required at the application roller 31 and as a function of space requirement constraints. The contact surface and therefore principally the length of the fiber in contact with the cylinders 91 is a function of the friction force required. In the present embodiment, the feeder includes four cylinders 91 placed in staggered rows: an input cylinder 91a, a first intermediate cylinder 91b, a second intermediate cylinder 91c and an output cylinder 91d, the first intermediate cylinder 91b and the output cylinder 91d defining a plane arranged parallel to and above the plane defined by the input cylinder 91a and the second intermediate cylinder 91c. The cylinders 91 are rotated by a single motor 92, automatically controlled by the control unit, by means of a belt 96 mounted on the motor pinion 92a and on an end portion of each cylinder 91, through a return pulley 93. With reference to FIG. 8, the input cylinder 91a and the second intermediate cylinder 91c are driven in the clockwise direction, the first intermediate cylinder 91b and the output cylinder 91d being driven in the counterclockwise direction. The sections 73a of conveying tubes 73 coming from the racks 71 are connected to an input ramp 174a, fitted with eyelets 79 and mounted parallel to the cylinders 91, so as to bring the fibers F to the input roller 91a in the form of a layer. The fibers F come into contact by a first surface on the input cylinder 91a, over a little more than a quarter turn, then by their second surface on the first intermediate cylinder 91b, over more than a half turn, then by their first surface on the second intermediate cylinder 91c, over more than a half turn, and finally on the output cylinder 91d by their second surface over more than a quarter turn. The fibers F then pass into conveying tube sections 73b to be conveyed to the placement head 3, said sections 73b being mounted on an output ramp 174b, similar to the input ramp 174a and are brought together in a protective pipe in order to be connected at the end to the ramp 74 of the placement head 3.

The motor 92 is controlled by the control unit such that the peripheral speed of the cylinders 91 is for example 30% greater than the speed of movement of the fastest fiber. The cylinders 91 will be driven at a continuously controlled speed so as to be at all times approximately 30% faster than the speed of movement of the fastest fiber. As a variant, the cylinders 91 are driven at a constant speed, as soon as the machine 1 is set in motion, which will be determined as a function of programmed draping sequences.

The cylinders 91 have a smooth surface appearance so as not to damage the fibers F, but not polished so as to adhere sufficiently to the fibers F when a take-up tension is exerted on the fibers F when they leave the feeder 9. By way of example, a 45 micron hard anodization surface treatment of an aluminum cylinder machined with a roughness Ra of 0.5.mu.m ensures an adequate surface with a high resistance to wear and tear. To unwind balls of glass fibers after 6 meters of conveying tube or 6 kg bobbins of carbon fibers after 6 meters of conveying tube, 4 cylinders 50 mm in diameter give a take-up tension below 50 grams. The cylinders 91 can have annular grooves 97, each fiber being received individually in a groove so as to guarantee an accurate positioning of the fibers without contact between them.

As they enter the cylinders 91, the fibers F may be brought onto a tensioning bar, arranged between the input ramp 94 and the input cylinder 91a, in order to brake the fibers F when their tension is too low or inconsistent, and/or to eliminate their shape memory, particularly in the case of glass fibers which tend to retain the curvature of the ball.

As a function of the length of the conveying tubes 73 and fiber type, one or more tension limiting systems for each fiber may be necessary along their conveying system as far as the application roller 31. An additional feeder 9 may for example be provided at the output of the ball storage racks 71 and/or directly in the application head 3. Clearly, a feeder may be provided that includes rollers that are sufficiently long to receive all the fibers to be deposited, in other words the 28 fibers of the two fiber layers F1 and F2 in the present embodiment. The feeder, here built into a fiber placement machine with an on-line impregnation of dry fibers, may be used to pass pre-impregnated fibers into a fiber placement machine not fitted with resin application means.

FIGS. 9 to 14 show a feeder 109 according to a second embodiment, allowing two layers of fourteen fibers F to be treated. This feeder 109 mainly differs from the feeder 9 previously described in that the fibers F do not come directly into contact with the cylinders 191, since a belt 194 is inserted between each cylinder 191 and each fiber. This embodiment is particularly advantageous for passing pre-impregnated fibers.

Figure 9:
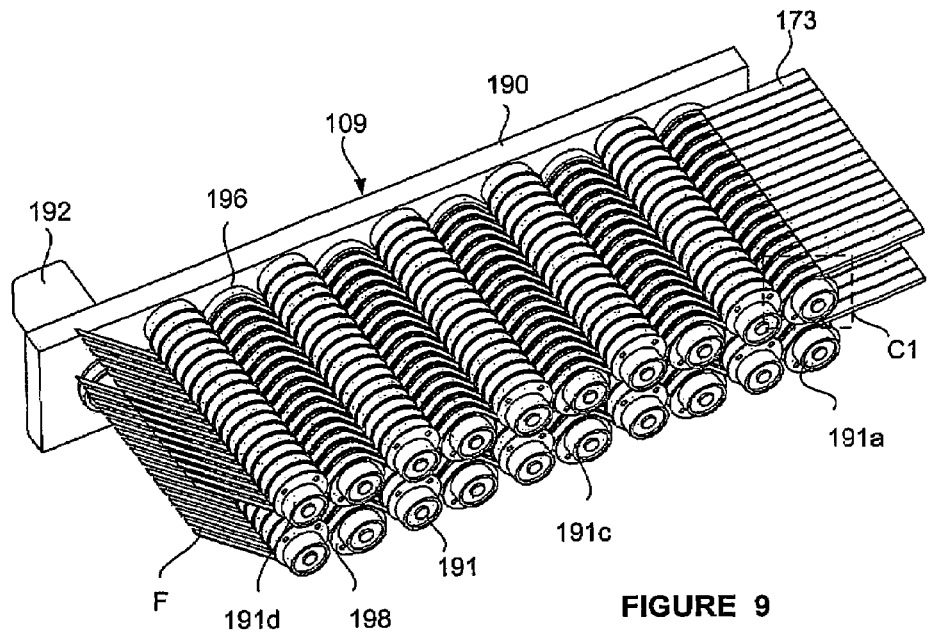
FIG. 9 is a perspective view of the constituent elements of the tension limiting system according to a second embodiment.
Figure 10:
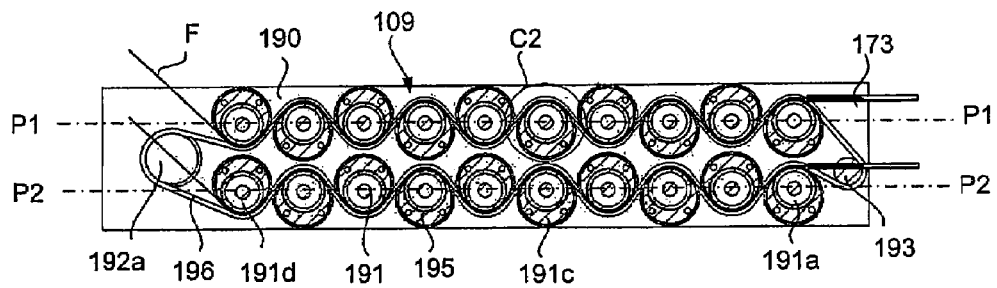
FIG. 10 is a longitudinal cross-section view of the tension limiting system in FIG. 9, perpendicular to the cylinders.
Figure 11:
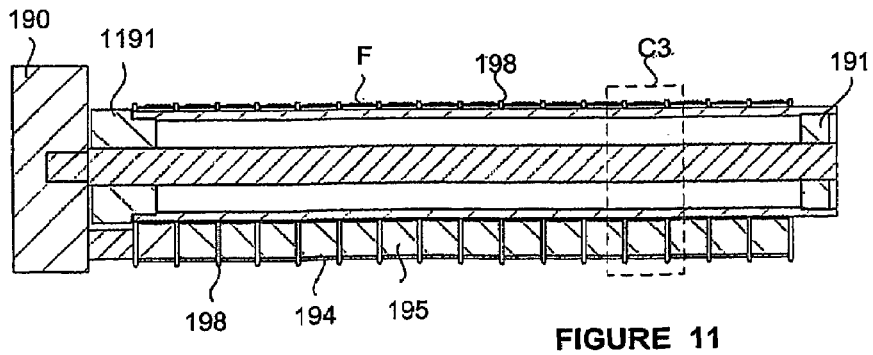
FIG. 11 is a transverse cross-section of the tension limiting system in FIG. 9, along the axis of one of the cylinders.
Figure 12:
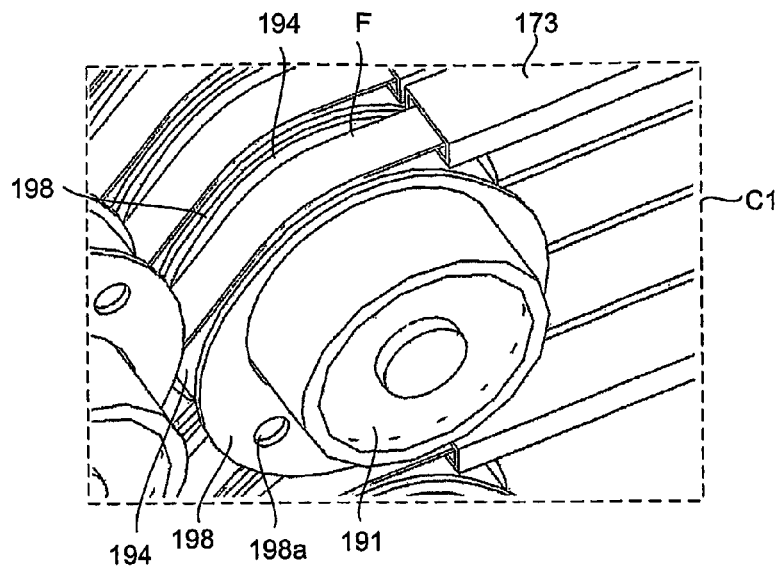
FIGS. 12, 13 and 14 are enlarged views respectively of the details C1, C2 and C3 in FIGS. 9, 10 and 11.

With reference to FIGS. 9 to 11, the feeder 109 includes two sets of motor-driven cylinders 191, mounted to rotate parallel to each other, cantilevered on a support 190, each set of cylinders 191 being intended for the passage of one layer of fibers. The cylinders 191 of a first set are arranged in sequence one after another, substantially along one and the same plane P1, the cylinders 191 of the second set being placed along a plane P2 parallel to the plane P1 of the first set. Each set includes an input cylinder 191a, intermediate cylinders 191c, for example eight in number, and an output cylinder 191d. The cylinders of the two sets are rotated by a single motor 192, automatically controlled by the control unit, as described previously, using a belt 196 mounted on the motor pinion 192a and on an end portion 1191 (FIG. 11) of each cylinder, through a return pulley 193.

With reference to FIGS. 11 to 14, each cylinder 191 is fitted with belts 194 that become interleaved between the fibers and the cylinder. Each belt 194 is mounted around the cylinder 191 and an additional guiding part or shoe 195 mounted fixed on the support 190. To restrict the amount of space required by the unit, each guiding shoe 195 is formed of a generally crescent moon shaped disc 1195, with a radius greater than that of the cylinder 191, provided with a circular recess 1195a whereof the radius of curvature is adapted to that of the cylinder 191 in order to mount the disc 1195 around the cylinder 191, without contact between the disc 1195 and the rotating cylinder 191, with its end portions 1195c, 1195d which come tangentially to fit to the cylinder 191. The belt 194 is mounted on the peripheral circular edge 1195b of the disc 1195 and on the circumferential portion of the cylinder 191 not covered by the disc 1195, defined between the two end portions 1195c-d of the disc 1195. The discs 1195 are placed flat against each other, interleaving flanges 198 between two adjacent discs and placing flanges 198 against the outer discs, so as to guide the belts 194 and the fibers F. The disc assembly is made using rods (not shown) that pass right through the discs 1195 and the flanges 198, passing through transverse openings 198a, 1195e (FIGS. 12 and 13) therein, the rods being anchored at the end to the support 190, parallel to each other. The fibers F passing over and then under two successive cylinders 191, or vice versa, the two guiding part assemblies associated with two successive cylinders are placed on either side of the plane P1 of the cylinders 191.

For two successive cylinders 191, each fiber comes flat via a first surface on a belt 194 of the first cylinder 191, between two flanges 198, at the level of the angular contact portion between the belt 194 and the cylinder 191, then flat via its second surface on a belt 194 of the second cylinder 191. The belts 194 have a width greater than that of the fibers F, substantially equal to the distance between two adjacent flanges 198, so as to guarantee that the fibers F are never in contact with the cylinders 191 in rotation.

For each cylinder 191, in the absence of take-up tension on a fiber, the belt 194 is in sliding contact with the cylinder 191. When a fiber is subjected to a take-up tension at the application roller 31, the fiber exerts pressure on the belt 194, and the latter is then rotated by the cylinder 191, thereby driving the fiber which adheres to the belt 194. The surface of the belt 194 on the fiber side has a coefficient of adhesion that allows the belt 194 to remain in contact with the fiber, the relative speed between the belt 194 and the fiber being nil or very small. The surface of the belt 194 on the cylinder side has a coefficient of friction that allows the belt 194 to be driven by the cylinder 191 when the fiber exerts pressure. This surface can have high resistance to wear and tear, and an anti-static property. As shown diagrammatically in FIG. 14, the belt 194 can consist of two layers 194*a*, 194*b* constituted by different materials. By way of example, the layer 194*a* on the fiber side is constituted by a soft elastomer whereas the layer 194*b* of the cylinder side is constituted by a hard elastomer.

Each belt 194 is in contact with a cylinder 191 over an angular portion making it possible on the one hand to drive the fiber when it exerts a pressure, on the other hand not to be driven by the cylinder 191 when the fiber is stopped. This angular portion is for example of the order of 90°.

The angular contact portion between the belt 194 and the fiber is less than the angular contact portion between the belt 194 and the cylinder 191, the distance between two cylinders 191 being defined such that the fibers F do not come into contact with the belts 194 at the end parts of the shoes 195. The angular contact portion between the fiber and the belt 194 will be determined so as to restrict the adhesion surface between the fiber and the belt 194, particularly with the employment of adhesive pre-impregnated fibers, thereby restricting the force necessary to dislodge the fiber (peeling force). The smaller this angular portion, the larger will be the number of intermediate cylinders 191*c*.

As previously disclosed, sections of flexible conveying tubes 173 coming from the racks 71 allow the fibers F to be brought to the input cylinders 191*a* in the form of layers. At output, the fibers F then pass into conveying tube sections (not shown) in order to be conveyed to the placement head 3. In this variant, the flexible tubes 173 are of rectangular cross-section, as can be seen better in FIG. 12. For one and the same layer, the tubes 173 are placed edge to edge. The use of tubes 173 of rectangular cross-section allows fibers of great widths to be conveyed, for example fibers from 6.35 mm to 25 mm in width, with no risk of the fiber turning upon itself or folding sideways. Indeed, whatever the movements of the robot 1, pipes of rectangular cross-section will flex in such a way that the fiber remains completely flat, with no risk of it sagging sideways. By way of example, in order to convey fibers that are 6.35 mm in width, the tubes have an internal rectangular cross-section of 8×2 mm, with a wall thickness of 1 mm, in other words an external cross-section of 10×4 mm. The tubes 173 may be assembled edge to edge at the end with a reduced space requirement, particularly in the application head 3, and with very short distances between the inlet or the outlet of the tubes 173 and the guiding pulleys at input and output.

Figure 15:
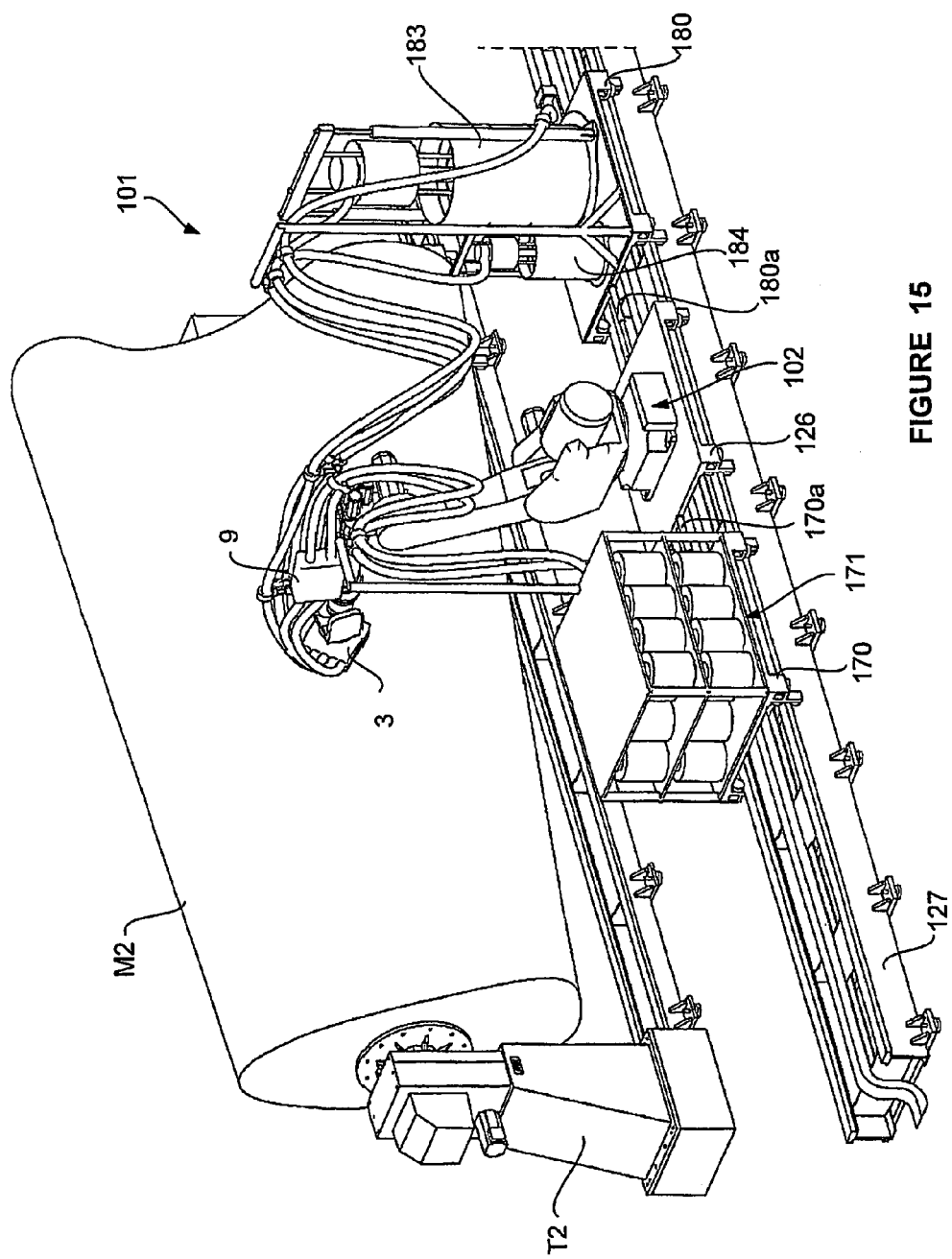
FIG. 15 is a diagrammatic perspective view of a placement machine according to a second embodiment.

FIG. 15 shows a second embodiment of a machine 101 according to the invention for applying fiber to a mandrel M2 mounted to rotate on a positioner T2 of horizontal axis. The placement machine 101 differs from the one previously described with reference to FIGS. 1 to 7, in that the robot 102 is assembled on a carriage 126 mounted sliding on a linear axis constituted by two rails 127, parallel to the axis of the positioner T2. The carriage 126 is fitted with drive means, for example of the motor-driven roller type, automatically controlled by the control unit of the machine 101, so as to displace the robot 102 along this linear axis. Additionally, the drum emptiers 183, 184 for resin storing and supply and the fiber storage racks 171 are also placed on carriages 170, 180 mounted to slide on the rails 127, on either side of the robot 102. These carriages 170, 180 are connected to the carriage 126 of the robot [[126]] 102 by connection arms 170*a*, 180*a* and/or are fitted with individual drive means.

Figure 16:
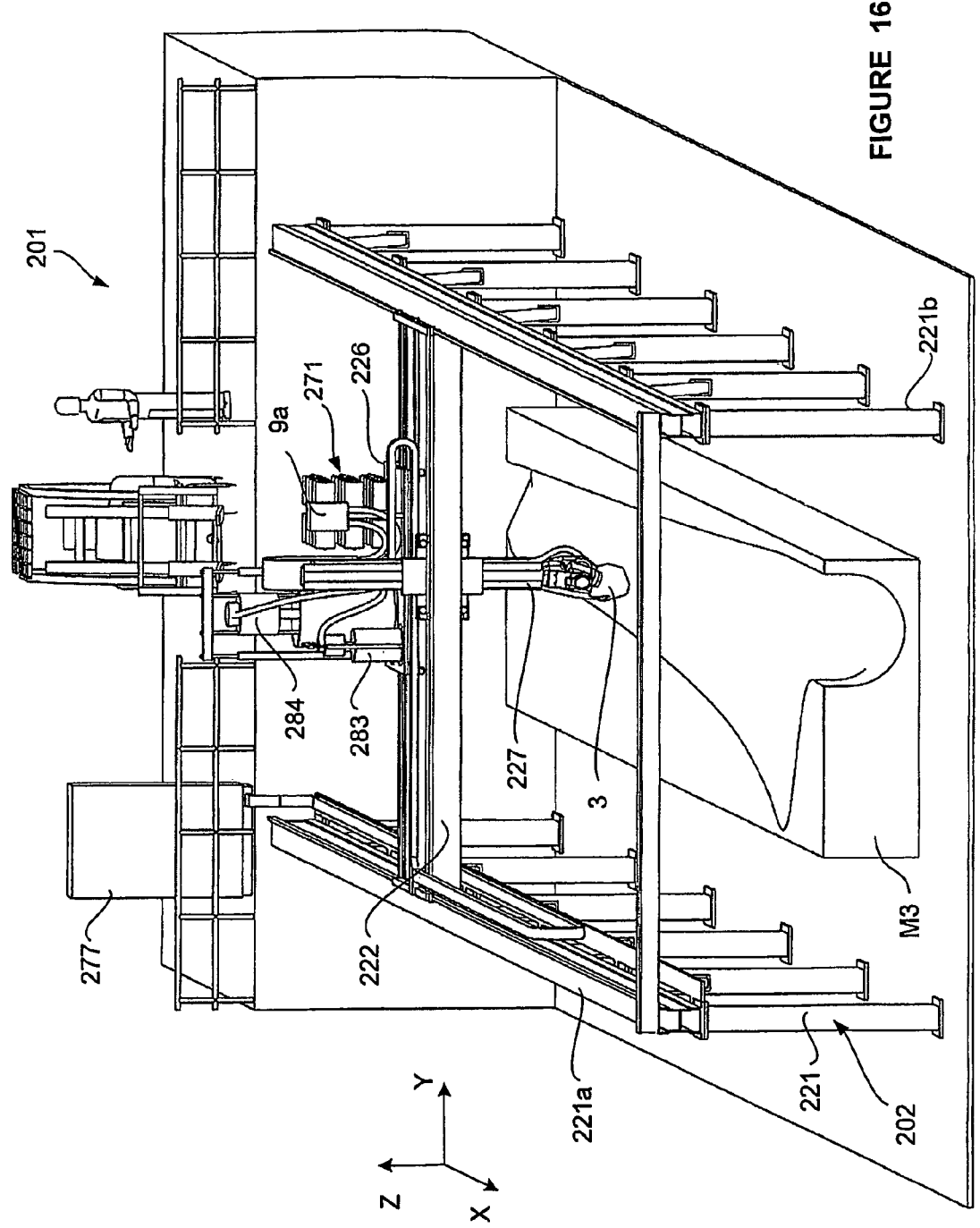
FIG. 16 is a diagrammatic perspective view of a placement machine according to a third embodiment; and, FIG. 17 is a partial enlarged perspective view of FIG. 16.
Figure 17:
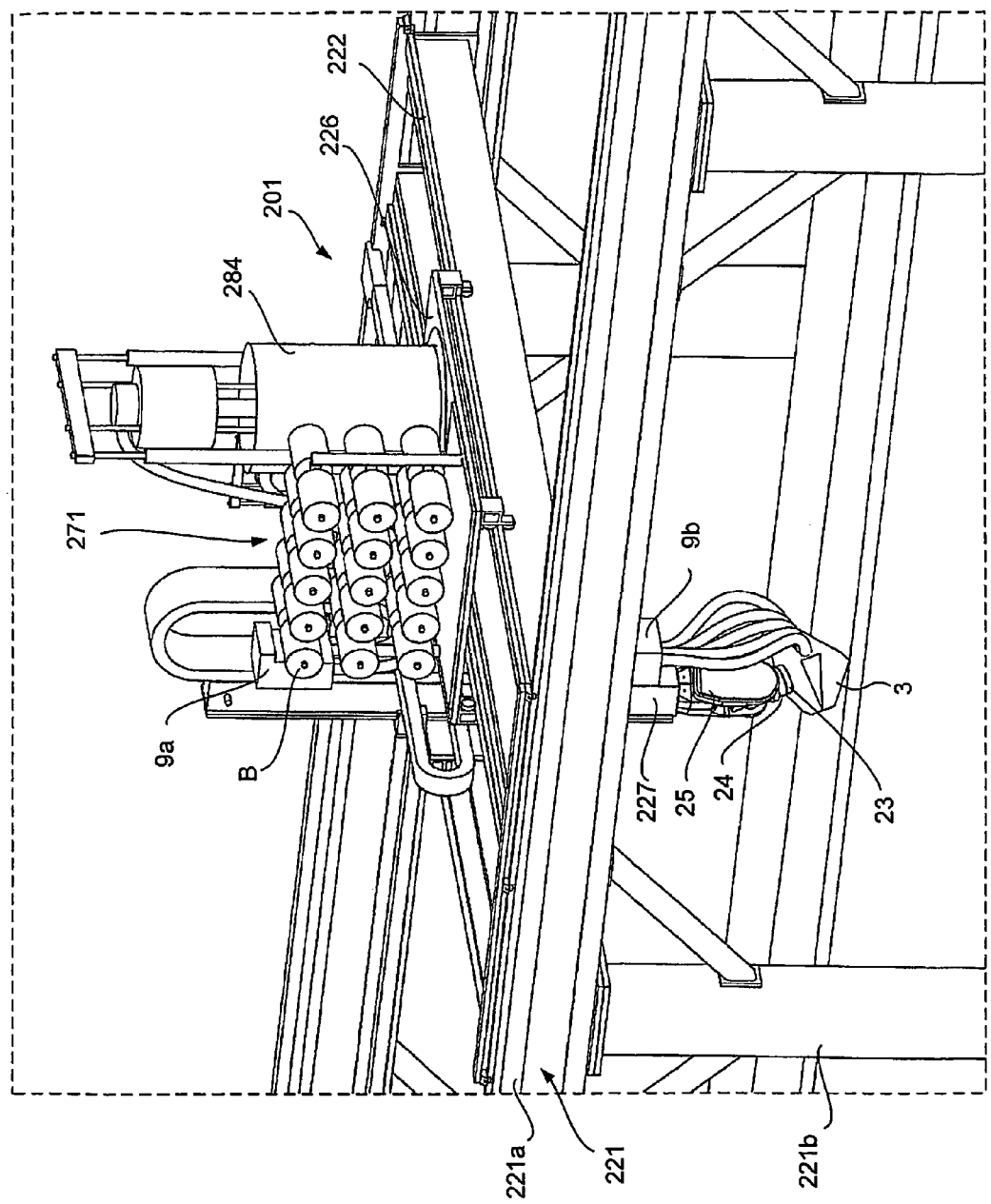

FIGS. 16 and 17 show a third embodiment of a placement machine 201 according to the invention. The machine displacement system 202 includes a first carriage 222 mounted mobile along a first horizontal direction X between the two parallel support bars 221*a* of a gantry 221, a second carriage 226 mounted mobile on the first carriage 222 along a second horizontal direction Y perpendicular to the first horizontal direction X, and a third carriage 227 mounted mobile on the second carriage 226 along a third vertical direction Z. The first, second and third carriages 222, 226, 227 are displaced by drive means built onto each of them, and automatically controlled by the control unit of the machine 201 placed in a box 277.

A robot wrist, including three sections 23, 24 and 25 and carrying a placement head 3, as described previously with reference to FIG. 2, is mounted to swivel around its axis A3 at the lower end of the third carriage 227, such that the placement head 3 is able to be displaced over a mold M3 placed between the uprights 221*b* of the gantry 221.

The drum emptiers 283, 284 for resin storing and supply are placed on the second carriage 226. The machine 201 is provided for the application of fibers, for example carbon fibers F, packaged in the form of bobbins B. The bobbins B are mounted on a creel 271 also placed on the second carriage 226. Each bobbin B is mounted on a mandrel of the creel 271, not automatically controlled in rotation, possibly fitted with rotation braking means. The fibers F pass on return rollers and/or in pulleys of the creel 271, then directly when leaving the creel 271 into a feeder 9*a*, as described previously according to the first or the second embodiment. The fibers F then pass into conveying tubes and then into a second feeder 9*b* mounted at the lower end of the third carriage 227, before the robot wrist. The fibers F are then conveyed by conveying tubes to the placement head 3. Controlling robot decelerations and/or mechanically adjusting the aforementioned braking means will allow the rotation inertia of the bobbins B to be controlled as they unwind, particularly when a fiber is cut as it passes in order to stop the bobbin B in rotation instantaneously or during significant decelerations.

In one embodiment, the machine according to the invention includes a creel fitted with an automatic braking system automatically controlled in a closed loop as a function of the fiber tension, as described in patent document EP 697990. This system has the advantage of being automatically controlled mechanically, with no sensor or electric or pneumatic actuator, which have the drawback of being always delayed at the start, which limits the acceleration or deceleration phases.

Although the invention has been described in conjunction with different particular embodiments, it is quite obvious that it is in no way restricted thereto and that it includes all technical equivalents of the means described as well as combinations thereof providing they fall within the framework of the invention.

The invention claimed is:

1. A fiber application machine that includes a system for moving a fiber application head, the fiber application machine comprising:
   a fiber application head, wherein the fiber application head comprises an application roller and means for guiding fibers onto said application roller;
   fiber storing means; and
   fiber conveying means for conveying the fibers from said fiber storing means to the application head, wherein the fiber application machine comprises at least one tension limiting system positioned between the fiber storing means and the application head, the at least one tension limiting system comprising
- at least two mutually parallel cylinders, whereon a plurality of fibers are able to be partly wound, each of the cylinders having a generally smooth, unpolished surface and
- drive means for rotating the at least two mutually parallel cylinders substantially at the same speed, said drive means being automatically controlled by a control unit of the fiber application machine, such that peripheral speeds of the cylinders are faster than moving speeds of the fibers resulting in a tensile stress exerted on the fibers that limits a take-up tension of the fibers at the application roller.

2. The fiber application machine according to claim 1, wherein the at least two mutually parallel cylinders are positioned such that each fiber is able to be partly wound around each cylinder, so as to come into contact on the at least two mutually parallel cylinders via two principal surfaces of each fiber.

3. The fiber application machine according to claim 1, wherein the at least two mutually parallel cylinders include annular grooves for receiving the fibers, the fibers coming directly into contact with the at least two mutually parallel cylinders.

4. The fiber application machine according to claim 1, wherein belts are mounted around each of the at least two mutually parallel cylinders of the tension limiting system, such that one belt becomes interleaved between each fiber and each cylinder, each belt being able to adhere to a fiber and to be driven by the cylinder as a function of a pressure exerted by the fiber on the belt.

5. The fiber application machine according to claim 4, wherein each belt is mounted in a loop on a sliding path formed partly by each cylinder and additional means so as to limit an angular contact portion between the belt and the cylinder, an angular contact portion between a fiber and a belt being less than or equal to the angular contact portion between the belt and cylinder.

6. The fiber application machine according to claim 5, wherein said additional means comprise crescent moon shaped discs mounted around each cylinder, such that end parts of each of the at least one disc tangentially fit each cylinder, and wherein each belt is mounted around a circular peripheral edge of a disc and on a circumferential portion of the cylinder not covered by said disc.

7. The fiber application machine according to claim 6, wherein each cylinder is fitted with discs laid flat against each other, and wherein guiding flanges are positioned between two adjacent discs and against outer discs, so as to guide the belts and the fibers.

8. The fiber application machine according to claim 4, wherein each belt is formed of two layers, each layer formed of a different material.

9. The fiber application machine according to claim 1, wherein the drive means are controlled such that the peripheral speed of the cylinders is from about 20 to about 40% faster than a highest fiber movement speed.

10. The fiber application machine according to claim 1, wherein the fiber conveying means include flexible tubes, each flexible tube being able to receive a fiber into an inner channel of the flexible tube, each flexible tube being fixedly mounted by ends of each tube between the tension limiting system and the storing means and between the tension limiting system and the application head.

11. The fiber application machine according to claim 10, wherein the flexible tubes are of rectangular cross-section.

12. The fiber application machine according to claim 10, wherein the flexible tubes are constituted by high-density polyethylene.

13. The fiber application machine according to claim 1, further comprising means for the application of resin to each fiber.

14. The fiber application machine according to claim 13, wherein said resin application means are placed between a dry fiber storing means and the tension limiting system.

15. The fiber application machine according to claim 13, wherein the resin application means are positioned within the fiber application head.

16. The fiber application machine according to claim 15, further comprising cutting means adapted to cut the fibers, and re-routing means adapted to re-route each fiber that has just been cut by the cutting means, said cutting means and re-routing means being placed upstream of the resin application means, said guiding means further comprising for each fiber, ducts between which the cutting means and the re-routing means are placed.

17. A fiber application machine comprising:
- a fiber application head comprising:
    - an application roller; and
    - means for guiding fibers onto said application roller;
- fiber storing means; and
- fiber conveying means for conveying fibers from said fiber storing means to the fiber application head, wherein the fiber conveying means include flexible tubes having a generally rectangular cross-section, each tube being able to receive a fiber in an inner channel of the flexible tube wherein the fibers are in the form of ribbons and the tubes convey the fiber to the fiber application head in a substantially flat configuration.

18. The machine according to claim 17, wherein the flexible tubes are constituted by high-density polyethylene.

19. The machine according to claim 18, wherein the flexible tubes are constituted by high-density anti-static polyethylene.

20. The machine according to claim 17, wherein the flexible tubes are connected at the end to ramps.

21. The machine according to claim 17, wherein a displacement system is able to displace the application head in at least three directions perpendicular to each other.

22. The machine according to claim 21, wherein the displacement system comprises a robot that includes a multi-articulated wrist or arm at the end of which said application head is mounted.

23. The machine according to claim 22, wherein the displacement system is formed by a standard robot of the multi-articulated type, placed on the floor or mounted on a linear axis or a gantry.

24. The machine according to 17, wherein the fiber storing means comprise a creel, said storing means being placed on the floor or mounted on an element of the displacement system.

25. The machine according to claim 17, wherein the means for guiding fibers onto said application roller guides adjacent fibers in a substantially edge to edge fashion.

26. A fiber application head, adapted to be mounted at an end of a displacement system, the fiber application head comprising:
- an application roller; and
- means for guiding the fibers onto said application roller, wherein the fiber application head further includes means for the application of resin to each fiber, said application means being able to apply resin to the fibers as the fibers leave the guiding means on only a surface of the fiber that is opposite of a surface that contacts the application roller.

27. A fiber application machine comprising:
the fiber application head of claim 26;
a system for moving the fiber application head;
fiber storing means; and
fiber conveying means for conveying fibers from said storing means to the application head.

28. The machine according to claim 27, further including a dosing means able to supply said resin application means of the placement head with resin at a flow rate controlled as a function of the fiber displacement speed, said dosing means being automatically controlled by a control unit of the machine.

29. The machine according to claim 28, wherein the dosing means include at least one volumetric pump comprising a dosing chamber with an outlet, a piston mobile in the dosing chamber, and means for actuating said piston automatically controlled by the control unit.

30. The machine according to claim 28, further including storing and supply means able to store resin and supply said dosing means with resin.

31. The fiber application head according to claim 26, wherein said application means are able to coat the surface of the fibers opposite the application roller with resin in the form of a film, and/or to deposit resin on said surfaces in the form of a bead.

32. The fiber application head according to claim 31, wherein said resin application means may include at least one lip nozzle.

33. The fiber application head according to claim 32, wherein said resin application means include at least one lip nozzle fitted with a foil defining a plurality of dispensing channels.

34. The fiber application head according to claim 31, wherein the resin application means include a plurality of dispensing channels arranged facing said application roller so that resin can be applied to the surface of the fibers opposite the application roller.

35. The fiber application head according to claim 34, wherein said resin application means include a plurality of tubular nozzles, each defining a dispensing channel for a fiber.

36. The fiber application head according to claim 26, further including a dosing means able to supply said resin application means of the placement head with resin at a flow rate controlled as a function of the fiber displacement speed.

37. The fiber application head according to claim 26, further including a cutting means able to cut the fibers, and re-routing means able to reroute each fiber that has just been cut, said cutting means and re-routing means being placed upstream of the resin application means.

38. The fiber application head according to claim 37, wherein said guiding means include for each fiber, ducts, of circular transverse cross-section, between which the cutting means and the re-routing means are placed.

39. The fiber application head according to claim 38 wherein the re-routing means include drive systems with rollers and kicking rollers, and air injection means for the injection of gas into one of said guiding ducts.

40. A fiber application machine that includes a system for moving a fiber application head, the fiber application machine comprising:
a fiber application head, wherein the fiber application head comprises an application roller and means for guiding fibers onto said application roller;
fiber storing means; and
fiber conveying means for conveying the fibers from said fiber storing means to the application head, wherein the fiber application machine comprises at least one tension limiting system positioned between the fiber storing means and the application head, the at least one tension limiting system comprising
at least two mutually parallel cylinders, whereon a plurality of fibers are able to be partly wound, and
drive means for rotating the at least two mutually parallel cylinders substantially at the same speed, said drive means being automatically controlled by a control unit of the fiber application machine, such that peripheral speeds of the cylinders are faster than moving speeds of the fibers resulting in a tensile stress exerted on the fibers that limits a take-up tension of the fibers at the application roller,
wherein belts are mounted around each of the at least two mutually parallel cylinders of the tension limiting system, such that one belt becomes interleaved between each fiber and each cylinder, each belt being able to adhere to a fiber and to be driven by the cylinder as a function of a pressure exerted by the fiber on the belt.

* * * * *